US010632498B2

(12) United States Patent
Fujiwara

(10) Patent No.: US 10,632,498 B2
(45) Date of Patent: Apr. 28, 2020

(54) METHOD OF FORMING MULTILAYER COATING FILM

(71) Applicant: NIPPON PAINT AUTOMOTIVE COATINGS CO., LTD., Osaka (JP)

(72) Inventor: Shinichi Fujiwara, Osaka (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 15/107,364

(22) PCT Filed: Dec. 26, 2014

(86) PCT No.: PCT/JP2014/084612
§ 371 (c)(1),
(2) Date: Jun. 22, 2016

(87) PCT Pub. No.: WO2015/099151
PCT Pub. Date: Jul. 2, 2015

(65) Prior Publication Data
US 2016/0354805 A1    Dec. 8, 2016

(30) Foreign Application Priority Data
Dec. 27, 2013  (JP) ................... 2013-273600

(51) Int. Cl.
*B05D 7/00* (2006.01)
*B05D 5/06* (2006.01)
(Continued)

(52) U.S. Cl.
CPC ............ *B05D 7/572* (2013.01); *B05D 5/06* (2013.01); *C09D 5/00* (2013.01); *C09D 7/70* (2018.01); *C08K 3/04* (2013.01)

(58) Field of Classification Search
CPC .................................................. B05D 7/572
See application file for complete search history.

(56) References Cited

U.S. PATENT DOCUMENTS 4,097,639 A * 6/1978 Millar ................. B05D 3/0209
428/215
6,103,311 A * 8/2000 Masuda ................ B05D 5/068
427/202
(Continued)

FOREIGN PATENT DOCUMENTS

JP    H08-309280 A    11/1996
JP    H10-251555      9/1998
(Continued)

OTHER PUBLICATIONS

JP2005-211789 machine translation, 2005. (Year: 2005).*
Notice of Reasons for Rejection issued in Japanese Patent Application No. 2015-555060, dated May 30, 2017.

*Primary Examiner* — Robert A Vetere
(74) *Attorney, Agent, or Firm* — Knobbe, Martens, Olson & Bear LLP

(57) ABSTRACT

A method of forming a multilayer film including an intermediate forming an uncured intermediate coating film by applying an intermediate coat containing a photoluminescent pigment directly on top of an electrodeposited coating film formed on an object to be coated, forming an uncured base coating film by applying a base coating composition containing a colored pigment on the uncured intermediate coating film, forming an uncured clear coating film by applying a clear coating composition on the uncured base coating film, and simultaneously baking and curing the uncured intermediate coating film, uncured base coating film, and uncured clear coating film. The photoluminescent pigment in the intermediate coat is a thin-film shape having a volume-average particle diameter ($D_{50}$) of 5-20 μm and an average thickness of 0.01-0.3 μm.

4 Claims, 1 Drawing Sheet

(51) Int. Cl.
  *C09D 7/40* (2018.01)
  *C09D 5/00* (2006.01)
  *C08K 3/04* (2006.01)

(56) References Cited

U.S. PATENT DOCUMENTS

| | | | | |
|---|---|---|---|---|
| 6,165,621 | A * | 12/2000 | Kasari | B05D 5/068 427/380 |
| 2001/0014713 | A1 * | 8/2001 | Yukawa | C08F 230/02 524/547 |
| 2003/0091813 | A1 * | 5/2003 | Fuller | C09C 1/0015 428/323 |
| 2003/0185984 | A1 * | 10/2003 | Niedenfuer | B05D 1/42 427/256 |
| 2005/0214483 | A1 | 9/2005 | Fujieda et al. | |
| 2009/0206523 | A1 * | 8/2009 | Tanaka | B29C 47/20 264/515 |

FOREIGN PATENT DOCUMENTS

| | | |
|---|---|---|
| JP | 2000-279877 | 10/2000 |
| JP | 2002-309154 | 10/2002 |
| JP | 2004-262988 | 9/2004 |
| JP | 2005-211789 | 8/2005 |
| JP | 2005211789 A * | 8/2005 |
| JP | 2007-167720 A | 7/2007 |
| JP | 2008-237939 A | 10/2008 |
| JP | 4455731 | 4/2010 |
| JP | 2011-147916 | 8/2011 |
| JP | 4822991 | 11/2011 |
| JP | 4886994 | 2/2012 |
| WO | WO 97/47396 A1 | 12/1997 |
| WO | WO 2005/028574 | 3/2005 |
| WO | WO 2006/056866 A1 | 6/2006 |

\* cited by examiner

METHOD OF FORMING MULTILAYER COATING FILM

This application is the U.S. National Phase under 35 U.S.C. § 371 of International Application PCT/JP2014/084612, filed Dec. 26, 2014, designating the U.S., and published in Japanese as WO 2015/099150 on Jul. 2, 2015, which claims priority to Japanese Patent Application No. 2013-273600, filed Dec. 27, 2013, the entire contents of which are incorporated herein by reference.

TECHNICAL FIELD

The present invention relates to a method for forming a multilayer coating film. The present invention relates to, in more detail, a method for forming a multilayer coating film having a better feeling of depth.

BACKGROUND ART

It has been known that a plurality of coating films having various functions are formed with layers on a surface of a base material such as a vehicle outer panel. These plurality of coating films simultaneously protect the base material and provide a high design property, thus, largely contribute to improve an appearance of an automobile, and resultantly to evoke buyer's willingness to buy the automobile.

Further, in recent years, as applications of the vehicle outer panel or the like, a multilayer coating film having a better feeling of depth is being developed. There is proposed a technology in which, for example, a metallic coating composition (A), a colored coating composition (B) and a clear coating composition (C) are sequentially coated, and a color difference ΔE between a multilayer coating film made of the metallic coating composition (A) and the clear coating composition (C) and a multilayer coating film made of the metallic coating composition (A), the colored coating composition (B) and the clear coating composition (C) is set within a predetermined range (see Patent Document 1). It is said that according to this technology, the better feeling of depth can be obtained since a metallic coating film of a lower layer can be visually seen through a colored coating film of an upper layer, and a color unevenness of the multilayer coating film can be prevented from occurring even when a film thickness of the colored coating film fluctuates slightly.

Further, there is proposed a technology in which a first coating composition containing a colored component and a photoluminescent material, a second coating composition containing a colored component and a clear coating composition are sequentially coated, and a content of the colored component in the second coating composition is set within an extremely small predetermined range relative to a resin solid content (see Patent Document 2). It is said that, according to this technology, a multilayer coating film having a better feeling of depth and high saturation can be obtained.

Further, there is proposed a technology in which a base coating composition (A) containing a photoluminescent pigment, a clear coating composition (B), a color clear coating composition (C) containing a colored pigment or a dye and a top clear coating composition (D) are sequentially coated, and each of a difference Δh of color phase angle h between a base coating film and a color clear coating film, a difference ΔL of brightness L* between the base coating film and a multilayer coating film and a difference ΔC of saturation C* between base coating film and the multilayer coating film is set within a predetermined range (see Patent Document 3). According to this technology, it is said that a color unevenness of a frame and the like generated in an edge part can be prevented from occurring, and a multilayer coating film having an excellent feeling of depth and high saturation can be obtained (see Patent Document 3).

Still further, there is proposed a technology in which in a method of forming a laminated coating film in which, after forming a first cured coating film by sequentially coating a first aqueous base coating composition containing a photoluminescent pigment and a first clear coating composition followed by baking and curing, a second cured coating film is formed by sequentially coating a second aqueous base coating composition which do not contain the photoluminescent pigment and a second clear coating composition, further followed by baking and curing, each of PWCs of the first aqueous base coating composition and the second aqueous base coating composition is set within a predetermined range, an L* value, a flip-flop value and a C* value of a first cured coating film are defined, and each of a second base coating film thickness, an L* value and a C* value is set within a predetermined range (see Patent Document 4). According to this technology, it is said that a color phase fluctuation due to a film thickness fluctuation can be suppressed, and a high saturation laminated coating film having excellent feeling of depth can be obtained.

Further, there is proposed a technology in which in a method of forming a multilayer coating film by sequentially coating a first aqueous base coating composition containing a photoluminescent pigment, a second aqueous base coating composition containing a colored pigment, and a clear coating composition, coating composition solid concentrations of the first aqueous base coating composition and the second aqueous base coating composition respectively are set within a predetermined range, a film thickness of the first base coating film is set within a predetermined range, and a film thickness ratio of the first base coating film and the second base coating film is set within a predetermined range (see Patent Document 5). It is said that, according to this technology, an orientation property of the photoluminescent pigment can be improved, and a multilayer coating film having a design property with high saturation and a better feeling of depth can be obtained (see Patent Document 5).

Patent Document 1: Japanese Unexamined Patent Application, Publication No. 2000-279877
Patent Document 2: Japanese Patent No. 4455731
Patent Document 3: Japanese Patent No. 4886994
Patent Document 4: Japanese Patent No. 4822991
Patent Document 5: Japanese Unexamined Patent Application, Publication No. 2011-147916

DISCLOSURE OF THE INVENTION

Problems to be Solved by the Invention

As was described above, a conventional multilayer coating film having a feeling of depth is usually designed in such a manner that a photoluminescent pigment is contained in a first base coating film of a lower layer, and only a colored pigment is contained in a second base coating film of an upper layer, thus functions are divided into separate coating films. However, according to a design of a coating film like this, there were problems that the number of application steps increases, the operations become complicated, and the cost becomes high.

The present invention was performed in view of the above situations, and its object is to provide a method of forming a multilayer coating film capable of obtaining a multilayer coating film having an excellent feeling of depth according to a simple step.

Means for Solving the Problems

In order to achieve above objects, an aspect of the present invention provides a method of forming a multilayer coating film including: an intermediate coating composition application step of forming an uncured intermediate coating film by coating an intermediate coating composition containing a photoluminescent pigment directly on an electrodeposition coating film formed on an object to be coated; a base coating composition application step of forming an uncured base coating film by coating a base coating composition containing a colored pigment on the uncured intermediate coating film; a clear coating composition application step of forming an uncured clear coating film by coating a clear coating composition on the uncured base coating film; and a baking step of simultaneously baking and curing the uncured intermediate coating film, the uncured base coating film and the uncured clear coating film, in which the photoluminescent pigment in the intermediate coating composition has a volume average particle size $D_{50}$ of from 5 to 20 μm and a thin film shape having an average thickness of from 0.01 to 0.3 μm.

A content of the photoluminescent pigment in the intermediate coating composition is preferably from 5 to 30% by mass.

The intermediate coating film formed of the intermediate coating composition preferably has a light transmittance of 0.25% or less in a wavelength of from 400 to 700 nm.

The intermediate coating composition further contains a colored pigment, and when the intermediate coating film formed from the intermediate coating composition is formed on a white solid coating film having an L* value of 80 at a film thickness of 15±3 μm, a 25° C.* value is preferably 20 or more. Herein, the film thickness of 15±3 μm corresponds to 2 to 18 μm.

The base coating film formed of the base coat preferably has the 25° L* value of 60 or less and the 25° C.* value of 25 or more.

The method preferably includes a first prep-heating step between the intermediate coating composition application step and the base coating composition application step.

The method preferably includes a second pre-heating step between the base coating composition application step and the clear coating composition application step.

Further, another aspect of the present invention provides a multilayer coating film formed by the method of forming the multilayer coating film as described above.

Effects of the Invention

As a method of simplifying a coating step, it is considered to compound the photoluminescent pigment and the like in the intermediate coating film to impart a function of the base coating film to the intermediate coating film on the electrodeposition film with the intention of reducing the number of layers in the multilayer coating films. However, when the photoluminescent pigment and the like are compounded in the intermediate coating film, the hiding property of the intermediate coating film degrades and the light transmittance increases, as a result, a light beam reaches the electrodeposition film having an intrinsically low light resistance. Thus, at the same time with the deterioration of the electrodeposition coating film, there occurs a big issue that the peeling occurs in an interface between the intermediate coating film and the electrodeposition coating film.

By contrast, in the present invention, a thin film shaped photoluminescent pigment that has a relatively small particle size such as a volume average particle size $D_{50}$ of from 5 to 20 μm, and an average thickness of from 0.01 to 0.3 μm is compounded in the intermediate coating film. Thus, as a result of being capable of securing a high hiding property of the intermediate coating film and of suppressing the light transmittance low, the peeling in an interface between the intermediate coating film and the electrodeposition film can be avoided. Therefore, according to the present invention, a multilayer coating film that can reduce the number of layers of the multilayer coating film more than in the prior art and has a more excellent feeling of depth than in the prior art can be obtained according to a step simpler than in the prior art. As the result, operations can be simplified and the cost can be reduced.

Figure 1:
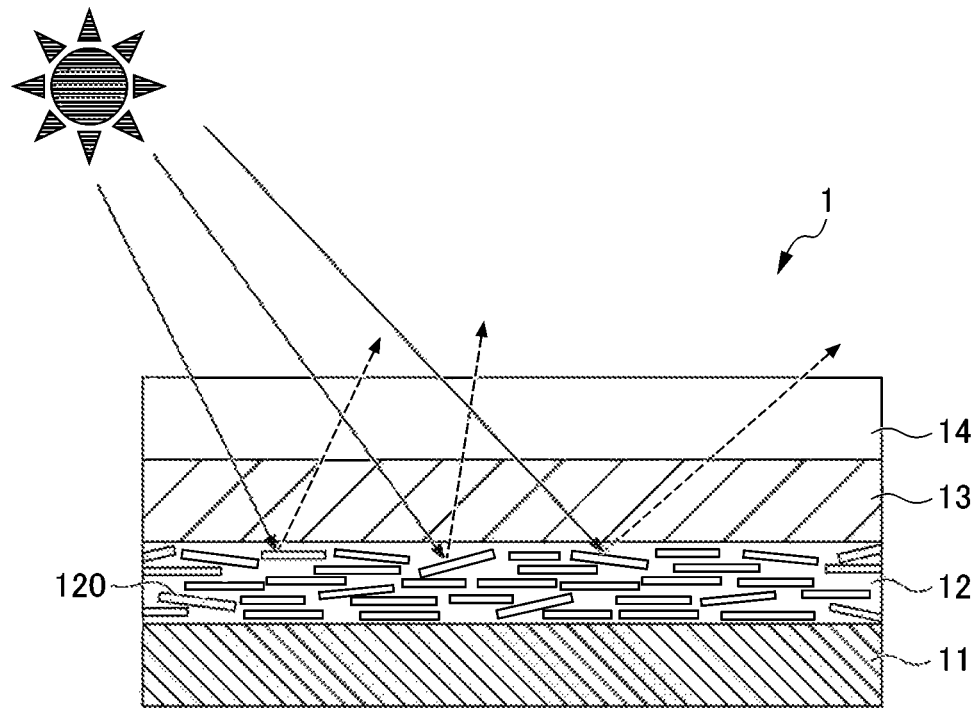
FIG. 1 is a schematic cross-sectional view of a multilayer coating film obtained by a method of forming a multilayer coating film according to an embodiment of the present invention.

PREFERRED MODE FOR CARRYING OUT
THE INVENTION

Hereinafter, an embodiment of the present invention will be described in more detail.

A method of forming a multilayer coating film according to the present embodiment is a coating method that adopts an electrostatic coating method of 3C1B (3 coats and 1 bake) and includes: an intermediate coating composition application step; a base coating composition application step; a clear coating composition application step; and a baking step of simultaneously baking an intermediate coating film formed according to the above intermediate coating composition application step, a base coating film formed according to the base coating composition application step and a clear coating film obtained according to the clear coating composition application step.

The method of forming a multilayer coating film according to the present embodiment can form a multilayer coating film having an excellent feeling of depth according to a step simpler than in the prior art.

Here, in the present specification, the "feeling of depth" means a texture of brightness/saturation expressed by a color having a high saturation while having a low to medium brightness. This "feeling of depth" is visually evaluated by an evaluator according to a sensory assessment test.

<Object to be Coated>

As an object to be coated, a metal to which electrodeposition coating can be applied may be used. As for the metal, for example, iron, copper, aluminum, tin, zinc and alloys containing these metals may be used. The method of forming a multilayer coating film according to the present embodiment can be preferably applied to a molded matter formed of these metals, for example, an outer plate of an automobile body or the like.

As the object to be coated, an electrodeposition coating is preferably applied after applying a chemical conversion treatment in advance with a phosphoric acid or zirconium-based chemical conversion treatment agent. Thus, an excellent anti-rust property is imparted to the object to be coated. Any of the cationic and anionic electrodeposition coats may be used as an electrodeposition coating composition. However, the cationic electrodeposition coating composition is preferably used from the viewpoint capable of obtaining a more excellent anti-corrosion property.

<Intermediate Coating Composition Application Step>

An intermediate coating composition application step is a step of coating an intermediate coating composition directly on an electrodeposition coating film formed on an object to be coated. As a coating method, an electrodeposition coating is preferably used. Specifically, for example, a rotary atomizing type electrodeposition coater is used to coat (the same also in the following electrostatic coating).

As for the intermediate coating composition, an intermediate coating composition containing a photoluminescent pigment, a colored pigment, and a coating film forming resin is used. An intermediate coating film formed of the intermediate coating composition secures a surface smoothness after a top coat coating to improve an appearance, and imparts various physical properties of a coating film such as impact resistance and chipping resistance.

Further, the intermediate coating composition of the present embodiment is preferably adjusted in its composition such that, in an intermediate coating film (hereinafter, it may be called a cured intermediate coating film) after the intermediate coating film formed of the intermediate coating composition was cured, the light transmittance in a wavelength of from 400 to 700 nm is 0.25% or less. Specifically, the light transmittance of the cured intermediate coating film is adjusted to 0.25% or less by adjusting the compounding types and compounding amounts of a photoluminescent pigment and a colored pigment described below. Thus, in the multilayer coating films of the respective paint colors, the intermediate coating film functions as a reflective layer and excellent feeling of depth can be obtained. Further, since the intermediate coating film has a high hiding property, an amount of light that reaches the electrodeposition coating film having intrinsically low light resistance can be reduced, as a result thereof, the electrodeposition coating film can avoid degradation and the peeling in an interface between the intermediate coating film and the electrodeposition coating film can be avoided.

The light transmittance is obtained by measuring the light transmittance of a single coating film formed using the intermediate coating composition for every 10 nm in a wavelength of from 400 to 700 nm using a spectrophotometer (U-3310 manufactured by Hitachi Limited) and is necessary to be 0.25% or less in all wavelengths.

[Photoluminescent Pigment]

Examples of the photoluminescent pigments compounded in the intermediate coating composition include color free or colored photoluminescent pigments of metals or alloys such as aluminum, copper, zinc, iron, nickel, tin, and aluminum oxide and the like. Further, the photoluminescent pigments such as interference mica, white mica, graphite, and glass flake and the like can be also used.

Among these, as the photoluminescent pigment compounded in the intermediate coating composition, at least one kind of the scale-like photoluminescent pigment selected from the group of an aluminum-based photoluminescent pigment and a mica-based photoluminescent pigment is preferably used. An aluminum flake, an interference mica or the like can be used as the photoluminescent pigment corresponding to these.

The photoluminescent pigment compounded in the intermediate coating composition has a volume average particle size $D_{50}$ of from 5 to 20 µm and is small. When the volume average particle size $D_{50}$ of the photoluminescent pigment is within this range, the peeling in an interface between the intermediate coating film and the electrodeposition coating film can be avoided, and an excellent feeling of depth can be obtained. A more preferable volume average particle size $D_{50}$ is from 8 to 17 µm.

The volume average particle size $D_{50}$ is a particle size when, in a particle size distribution of the photoluminescent pigment, a total volume of particles integrated between from a small particle size side to a certain particle size represented on percentage to a volume of all particles is 50%. The volume average particle size $D_{50}$ can be measured using a dynamic light scattering method, in particular, UPA-150 (Microtrac Particle Size Analyzer manufactured by Nikkiso Co., Ltd.) and an electron microscope.

Further, the photoluminescent pigment has a thin film shape (scale-like shape) and its average thickness is from 0.01 to 0.3 µm. When the average thickness of the thin film shaped photoluminescent pigment is within this range, the peeling in an interface between the intermediate coating film and the electrodeposition coating film can be avoided, and a multilayer coating film having an excellent feeling of depth can be obtained.

Here, the average thickness can be obtained by measuring thicknesses of 100 particles of the photoluminescent pigment randomly selected by a scanning electron microscope SEM and by calculating its number average value.

Figure 2:
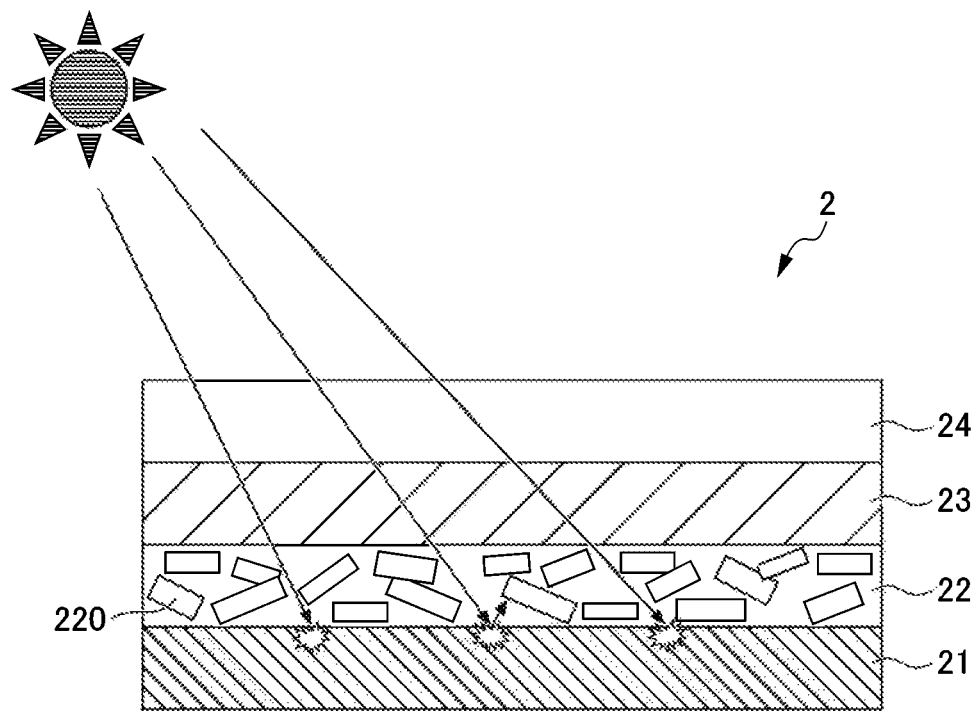
FIG. 2 is a schematic cross-sectional view of a multilayer coating film in which a conventionally general photoluminescent pigment is compounded in an intermediate coating film.

Here, FIG. 1 is a schematic cross-sectional view of a multilayer coating film 1 (an electrodeposition coating film 11, an intermediate coating film 12, a base coating film 13 and a clear coating film 14) obtained according to a method of forming a multilayer coating film of the present embodiment. FIG. 2 is a schematic cross-sectional view of a multilayer coating film 2 (an electrodeposition coating film 21, an intermediate coating film 22, a base coating film 23 and a clear coating film 24) in which a conventionally general photoluminescent pigment (that is, a photoluminescent pigment of which $D_{50}$ and average thickness are outside of the ranges of the present invention) was compounded in an intermediate coating film.

As shown in FIG. 2, when a conventionally general photoluminescent pigment 220 having the $D_{50}$ exceeding 20 µm and the average thickness exceeding 0.3 µm is compounded in the intermediate coating film 22, when particles of the photoluminescent pigment 220 overlap with each other, its orientation fluctuates. Thus, since the light transmittance of the intermediate coating film 22 becomes higher, the intermediate coating film 22 does not sufficiently function as the reflective layer and an amount of light reaching the electrodeposition coating film 21 having intrinsically low light resistance increases. As the result, at the same time with degradation of the electrodeposition coating film 21, the peeling occurs in an interface between the intermediate coating film 22 and the electrodeposition coating film 21.

On the other hand, according to the multilayer coating film 1 of the present embodiment, as shown in FIG. 1, the photoluminescent pigment 120 is arranged in a high orientation state in which a surface direction of the photoluminescent pigment is substantially in parallel with the object to be coated, because the $D_{50}$ of the photoluminescent pigment 120 is small such as from 5 to 20 µm and the average thickness is such thin as from 0.01 to 0.3 µm, even when particles of the photoluminescent pigment 120 overlap, its orientation is difficult to fluctuate. Thus, since the light transmittance of the intermediate coating film 12 can be reduced to 0.25% or less, the intermediate coating film 12 functions as the reflective layer and an amount of light that reaches the electrodeposition coating film 11 can be reduced. As a result, the electrodeposition coating film 11 can avoid degradation, and the peeling in an interface between the intermediate coating film 12 and the electrodeposition coating film 11 can be avoided.

The hiding property of the intermediate coating film is evaluated by a black/white hiding film thickness. The black/white hiding film thickness is measured by using a contrast ratio measurement paper (JIS K-5600) used in a measurement of the hiding power of a coating composition. The measurement method of the black/white hiding film thickness is as shown below.

First, the intermediate coat is spray coated on a 2×2 cm square monochrome checked pattern that the contrast measurement paper has such that a film thickness gradient of a dry film thickness may be formed, followed by baking and curing. Then, a limit region of the coating film at which the black/white checked pattern cannot be seen through is visually determined, and a film thickness of the region is measured. A measured film thickness is taken as a black/white hiding thickness.

A content of the photoluminescent pigment in the intermediate coating composition is preferably from 5 to 30% by mass in terms of a pigment mass concentration (PWC) in the intermediate coating composition. When the PWC of the photoluminescent pigment is within this range, a multilayer coating film having an excellent feeling of depth can be obtained. More preferably, the PWC is from 7 to 20% by mass.

The PWC of the photoluminescent pigment is a mass ratio of a total mass of all photoluminescent pigments to a total mass of all pigments including pigments other than photoluminescent pigments and all resin components, and is calculated by the following formula (1).

PWC of photoluminescent pigments=(a total mass of all photoluminescent pigments)/(a total mass of all pigments and a solid content of all resin components in the intermediate coating composition)×100(% by mass)   Formula (1)

[Colored Pigment]

Any of organic colored pigments and inorganic colored pigments can be used as a colored pigment compounded in the intermediate coating composition. Examples of the organic colored pigments include azo chelate-based pigments, insoluble azo-based pigments, condensation azo-based pigments, diketopyrrolopyrrole-based pigments, benzimidazolone-based pigments, phthalocyanine-based pigments, indigo pigments, perinone-based pigments, perylene-based pigments, dioxane-based pigments, quinacridone-based pigments, isoindolinone-based pigments, and metal complex pigments. These may be used in a combination of two or more kinds thereof. Further, examples of the inorganic colored pigments include chrome yellow, yellowish iron oxide, colcothar, carbon black, and titanium oxide. These may be used in a combination.

Among the colored pigments listed above, a colored pigment having a high saturation is preferably used to obtain a coating film having a high feeling of depth. Thus, a multilayer coating film having an excellent feeling of depth and high saturation can be obtained.

The colored pigment compounded in the intermediate coating composition is selected such that the intermediate coating film may have a shade the same as that of the base coating film described below. Preferably, as the colored pigment compounded in the intermediate coating composition, a colored pigment of the same kind as the colored pigment compounded in the base coating film is used.

Here, the intermediate coating film formed of the intermediate coating composition preferably has a 25° C.* value of 20 or more when the intermediate coating film is formed at a dry film thickness of 15±3 μm on a white solid coating film having an L* value of 80. Therefore, as the colored pigment compounded in the intermediate coating composition, among the above colored pigments, a colored pigment such as satisfying these conditions is preferably selected.

Here, the L* value and the C* value are obtained according to JIS Z8729. The L* value and the C* value are an indicator used to express a color of an object to be measured according to an L*a*b color coordinate system (CIE 1976). In this color coordinate system, the L* value expresses the brightness, and the chromaticity expressing a color phase and saturation is expressed by an a* value and a b* value.

The a* value and b* value are called a chromaticness index and expresses a direction of a color. The a* value has zero as an origin, which means that a degree of green increases in a color phase of an object to be measured when a numerical value becomes a negative value, and, means that a degree of red increases when the numerical value becomes a positive value. Further, the b* value has zero as an origin, which means that a degree of blue increases in a color phase of the object to be measured when a numerical value becomes a negative value, and, means that a degree of yellow increases when the numerical value becomes a positive value. When both of the a* value and the b* value are zero, it means a colorless achromatic color. The C* value expresses the saturation and is expressed by a formula $(a^2+b^2)^{1/2}$.

The brightness L* value means that, as its numerical value increases, a degree of white increases in a color phase of the object to be measured, and as its numerical value decreases, a degree of black increases. In the present application, all of the L* values refer to a 25° L value. The saturation C* value means that a color of the object to be measured becomes sharper as the value becomes larger. By contrast, when the C* value is small, it means being close to a colorless achromatic color. In the present application, all of the C* values refer to a 25° C.* value. These L* value and C* value can be measured using "CM512m-3" (a spectrophotometric colorimeter manufactured by Konica Minolta, Inc.).

For example, the 25° L* value and the 25° C.* value mean an L* value and C* value received when a light source is irradiated from an angle to be 25° in the case where a light receiving part in a vertical position to a coating film that is an object to be measured is set at 0°.

The intermediate coating film formed of the intermediate coating composition of the present embodiment has the 25° C.* value of 20 or more on the white solid coating film having the L* value of 80 which means that the intermediate coating film formed of the intermediate coat has a clear hue. The reason why the 25° C.* value when the intermediate coating film is formed at a (dry) film thickness of 15±3 μm on the white solid coating film having the L* value of 80 is measured is to evaluate a saturation intrinsic to the colored pigment by excluding an influence of the ground when measuring the C* value. "The white solid coating film having the L* value of 80" used in the ground means that it is a white coating film that does not have a so-called flip-flop property.

As a colored pigment that satisfies the above condition, that is, that the 25° C.* value becomes 20 or more when the intermediate coating film is formed at a (dry) film thickness of 15±3 μm on the white solid coating film having the L* value of 80, for example, a perylene red pigment "P2GL" manufactured by Clariant Japan is preferably contained at the PWC of, for example, from 5 to 10%. As the relevant colored pigment, not only in red but also in other color phases, a similar paint color design can be applied.

A content of the colored pigment in the intermediate coating composition is preferably from 5 to 30% by mass in terms of the pigment mass concentration (PWC) in the intermediate coating composition. When the PWC of the colored pigment is within this range, a multilayer coating film having excellent feeling of depth and high saturation can be obtained. More preferably, the PWC is from 7 to 20% by mass.

The PWC of the colored pigment is a mass ratio of a total mass of all colored pigments to a total mass of all pigments including pigments other than colored pigments and all resin components and is calculated by the following formula (2).

PWC of colored pigments=(a total mass of all colored pigments)/(a total mass of all pigments and solid content of all resin components in the intermediate coating composition)×100(% by mass)   Formula (2)

[Coating Film Forming Resin]

The intermediate coating composition used in the present embodiment contains preferably at least a hydroxyl-containing acrylic resin emulsion and a melamine resin, in a state dispersed or dissolved in an aqueous medium. The intermediate coating composition may further contain a hydroxyl-containing polyester resin or the above pigment, and may contain additives usually contained in an aqueous intermediate coating composition for an automobile body such as a viscosity agent or a filler.

The hydroxyl-containing acrylic resin emulsion can be obtained by emulsion polymerizing a monomer mixture containing a (meth)acrylic acid alkyl ester (a), an acid-containing ethylenically unsaturated monomer (b) and a hydroxyl-containing ethylenically unsaturated monomer (c). Compounds illustrated below as components of the monomer mixture may be used singularly or in an appropriate combination of one kind or two or more kinds.

When the intermediate coating composition used in the present embodiment contains the hydroxyl-containing acrylic resin emulsion and a below-described alkyl-etherified melamine resin having imino groups per one triazine nucleus at the number of less than 1.0 on average and the number average molecular weight of less than 1000, a multilayer coating film that has, while securing excellent adhesiveness between the intermediate coating film and the top coating film, an excellent finish appearance can be formed.

The above (meth)acrylic acid alkyl ester (a) constitutes a main skeleton of the hydroxyl-containing acrylic resin emulsion. Specific examples of the (meth)acrylic acid alkyl esters include methyl (meth)acrylate, ethyl (meth)acrylate, propyl (meth)acrylate, n-butyl (meth)acrylate, isobutyl (meth)acrylate, t-butyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate, and stearyl (meth)acrylate.

The above acid-containing ethylenically unsaturated monomer (b) is used to improve various stabilities such as storage stability, mechanical stability, and stability to freezing of the obtained hydroxyl-containing acrylic resin emulsion, and promotes a curing reaction with a curing agent such as the melamine resin during coating film formation. The acid group is preferably selected from a carboxyl group, a sulfonic acid group and a phosphoric acid group. A particularly preferable acid group is a carboxyl group from the viewpoint of improving the above various stabilities and a curing reaction promoting function.

Examples of the above carboxyl-containing ethylenically unsaturated monomers include acrylic acid, methacrylic acid, crotonic acid, isocrotonic acid, ethacrylic acid, propylacrylic acid, isopropylacrylic acid, itaconic acid, maleic anhydrate, and fumaric acid. Examples of sulfonic acid-containing ethylenically unsaturated monomers include p-vinyl benzenesulfonic acid, p-acrylamide propane sulfonic acid, and t-butylacrylamide sulfonic acid. Examples of phosphoric acid-containing ethylenically unsaturated monomers include Light Ester PM (manufactured by Kyoeisha Chemical, Co., Ltd.) such as a phosphoric acid monoester of 2-hydroxyethyl acrylate and a phosphoric acid monoester of 2-hydroxypropyl methacrylate.

The above hydroxyl-containing ethylenically unsaturated monomer (c) is used to impart hydrophilicity based on the hydroxyl group to the hydroxyl-containing acrylic resin emulsion, to increase workability and stability to freezing when this is used as a coating composition, and to impart a curing reactivity with a curing agent such as the melamine resin.

Examples of the above hydroxyl-containing ethylenically unsaturated monomers (c) include 2-hydroxyethyl (meth)acrylate, 2-hydroxypropyl (meth)acrylate, 4-hydroxybutyl (meth)acrylate, and epsilon-caprolactone modified acryl monomer.

Examples of the above epsilon-caprolactone-modified acryl monomers include "Placcel FA-1", "Placcel FA-2", "Placcel FA-3", "Placcel FA-4", "Placcel FA-5", "Placcel FM-1", "Placcel FM-2", "Placcel FM-3", "Placcel FM-4" and "Placcel FM-5", which are manufactured by DAICEL CHEMICAL INDUSTRIES, LTD.

The monomer mixture may contain at least one kind of monomer selected from the group consisting of a styrene-based monomer and (meth)acrylonitrile as another monomer component. As for the styrene-based monomer, other than styrene, alpha-methyl styrene or the like can be used.

Further, the monomer mixture may contain a crosslinking monomer such as a carbonyl-containing ethylenically unsaturated monomer, a monomer containing a hydrolytically polymerizable silyl group, and various polyfunctional vinyl monomers. In this case, the obtained hydroxyl-containing acrylic resin emulsion becomes self-crosslinkable.

An emulsion polymerization in preparation of the hydroxyl-containing acrylic resin emulsion can be performed by heating under stirring the above monomer mixture in an aqueous liquid under the presence of a radical polymerization initiator and an emulsifier. A reaction temperature is set to, for example, from about 30 to 100° C., and a reaction time is preferably, for example, from about 1 to 10 hours. The reaction temperature may be adjusted by adding the monomer mixture and a pre-emulsified liquid of monomer in a lump or by temporarily dropping to a reactor containing water and an emulsifier.

As for the above radical polymerization initiator, a known initiator usually used in an emulsion polymerization of an acrylic resin can be used. Specifically, as an aqueous free-radical polymerization initiator, a persulfate such as potassium persulfate, sodium persulfate or ammonium persulfate can be used in the form of an aqueous solution. Further, a so-called redox-based initiator in which an oxidant such as potassium persulfate, sodium persulfate, ammonium persulfate or hydrogen peroxide, and a reducing agent such as sodium hydrogen sulfite, sodium thiosulfate, Rongalite, or ascorbic acid are combined is used in the form of an aqueous solution.

As for the above emulsifier, an anionic or a nonionic emulsifier selected from micell compounds which have a hydrocarbon group having 6 or more carbon atoms and a hydrophilic portion such as a carboxylate, a sulfonate, or a sulfate partial ester, in the same molecule is used. Examples of the anionic emulsifier include an alkali metal salt or an ammonium salt of a half ester of sulfuric acid with an alkyl phenol or a higher alcohol; an alkali metal salt or an ammonium salt of an alkyl sulfonate or an allyl sulfonate; and an alkali metal salt or an ammonium salt of a half ester of sulfuric acid with polyoxyethylene alkylphenyl ether, polyoxyethylene alkyl ether or polyoxyethylene allyl ether. Further, examples of the nonionic emulsifiers include polyoxyethylene alkylphenyl ether, polyoxyethylene alkyl ether and polyoxyethylene allyl ether. Further, the emulsifier may include another emulsifiers other than these general-purpose anionic and nonionic emulsifiers, such as various anionic and nonionic reactive emulsifiers, each of which has, in its molecule, a radically polymerizable unsaturated double bond-containing group, such as an acrylic group, a methacrylic group, a propenyl group, an allyl group, or an allyl ether group. These emulsifiers may be used appropriately alone or in a combination of two or more kinds.

Herein, during the emulsion polymerization, a combined application of an auxiliary agent (a chain-transfer agent) for controlling a molecular weight such as a mercaptan compound or a lower alcohol is preferable in many cases from the viewpoint of proceeding the emulsion polymerization, further from the viewpoint of promoting a smooth and uniform formation of the coating film and improving the adhesiveness to the base, thus, the combined application is performed appropriately depending on the situations.

Further, the emulsion polymerization includes any of the normal polymerizations such as a continuous uniform addition of a monomer at a single stage; a core-shell polymerization including a multi-stage monomer feeding; and a power feed polymerization wherein a composition of the monomers to be fed is continuously altered during the polymerization.

Thus, the hydroxyl-containing acrylic resin emulsion, which is used in the present embodiment is prepared. A mass average molecular weight of the obtained acrylic resin emulsion is not particularly limited but is generally from about 50,000 to 1,000,000, for example, from about 100,000 to 800,000.

The glass transition temperature (Tg) of the above acrylic resin is from −50° C. to 20° C., preferably from −40° C. to 10° C., and more preferably from −30° C. to 0° C. By setting the Tg of the resin within this range, when the intermediate coating composition containing the hydroxyl-containing acrylic resin emulsion is used wet on wet, the affinity and adhesiveness of the intermediate coating composition with a priming coating composition and a top coat becomes excellent, the compatibility of the intermediate coat at an interface with an upper coating film in a wet state is excellent, and the layer conversion does not occur. Further, appropriate flexibility of the finally obtained coating film is obtained, and the chipping resistance is improved. As a result of these, a multilayer coating film having a very high appearance can be formed. When the Tg of the resin is lower than −50° C., the mechanical strength of the coating film becomes insufficient. As a result, the chipping resistance may degrade. By contrast, when the Tg of the resin exceeds 20° C., the coating film becomes hard and brittle. As a result, the impact resistance becomes insufficient and the chipping resistance may degrade. The kinds and compounding amounts of the above respective monomers are selected such that the Tg of the resin becomes within the above range.

A solid acid value of the acrylic resin in the above hydroxyl-containing acrylic resin emulsion is preferably from 3 to 50 mg KOH/g, and more preferably from 5 to 40 mg KOH/g. When the acid value is adjusted within the above range, various stabilities such as the storage stability, mechanical stability and stability to freezing of the resin emulsion and intermediate coating composition using the resin emulsion are improved, further, a curing reaction with a curing agent such as the melamine resin occurs enough during formation of the coating film, and the various strengths, chipping resistance and water resistance of the coating film are improved. When the solid acid value is less than 3 mg KOH/g, the above various stabilities may degrade, and, the curing reaction with the curing agent such as the melamine resin is insufficient, as a result, the various strengths, chipping resistance and water resistance of the coating film may degrade. By contrast, when the solid acid value exceeds 50 mg KOH/g, the polymerization stability of the resin may degrade or the water resistance of the obtained coating film may degrade.

The solid acid value of the acrylic resin in the hydroxyl-containing acrylic resin emulsion is adjusted by selecting the kinds and compounding amounts of the respective monomer components used for preparation of the hydroxyl-containing acrylic resin emulsion such that the acid value of the resin is within the above range. In this adjustment, a carboxyl-containing monomer is preferably used in the acid-containing ethylenically unsaturated monomer (b), among the acid-containing ethylenically unsaturated monomers (b), the carboxyl-containing monomer is used preferably in an amount of 50% by mass or more, and more preferably in an amount of 80% by mass or more.

The hydroxyl value (solid content) of the acrylic resin in the above hydroxyl-containing acrylic resin emulsion is preferably from 10 to 150 mg KOH/g, and, more preferably from 20 to 100 mg KOH/g. When the hydroxyl value is adjusted within the above range, appropriate hydrophilicity is imparted to the resin, and, when the resin is used as a coating composition containing the resin emulsion, the workability and the stability to freezing are increased, and the curing reactivity with the curing agent such as the melamine resin become excellent. When the hydroxyl value is less than 10 mg KOH/g, a curing reaction with the above curing agent becomes insufficient. As a result, the mechanical strength of the coating film may degrade, the chipping resistance may be insufficient, and the water resistance and solvent resistance may also be insufficient. By contrast, when the hydroxyl value exceeds 150 mg KOH/g, the water resistance of the obtained coating film degrades, the compatibility with the curing agent becomes insufficient, the curing reaction becomes inhomogeneous due to generation of strain in the coating film, as a result, the various strengths, in particular, the chipping resistance, solvent resistance and water resistance of the coating film may degrade. The hydroxyl value of the acrylic resin in the hydroxyl-containing acrylic resin emulsion can be adjusted by selecting the kinds and compounding amounts of the respective monomer components used for preparation of the hydroxyl-containing acrylic resin emulsion such that the hydroxyl value of the resin is within the above range.

In order to maintain the stability of the hydroxyl-containing acrylic resin emulsion, a basic compound may be added to the obtained hydroxyl-containing acrylic resin emulsion to neutralize a part or all of carboxylic acid. As for such basic compounds, generally, ammonia, various kinds of amines, alkali metals and the like are used, and these can be appropriately used also in the present embodiment.

A content of the hydroxyl-containing acrylic resin emulsion contained in the intermediate coating composition is preferably from 5 to 50% by mass, and more preferably from 7 to 40% by mass, to a coating composition of resin solid content. When the content of the hydroxyl-containing acrylic resin emulsion is less than 5% by mass, the coating film strength such as the chipping resistance property may degrade. By contrast, when the content of the hydroxyl-containing acrylic resin emulsion exceeds 50% by mass, the water resistance of the obtained coating film may degrade.

The intermediate coating composition in the present embodiment preferably contains from 10 to 35% by mass of the alkyl-etherized melamine resin that has imino groups per one triazine nucleus at the number of less than 1.0 by average and the number average molecular weight of less than 1000, to the coating composition resin solid content. The content of the above alkyl-etherized melamine resin is more preferably from 13 to 32% by mass. When the content of the above alkyl-etherized melamine resin is less than 10% by mass, an improvement in the appearance when the coating film is formed is not sufficient. Further, when the content exceeds 35% by mass, an adhesive property degrades when the coating film is formed.

In the intermediate coating composition in the present embodiment, by inclusion of the above alkyl-etherized melamine resin, in the 3C1B method, a reaction and curing speed of the intermediate coating film more close to the object to be coated can be suppressed. Then, thus, the reaction and curing speeds of the intermediate coating film and the base coating film during curing of the both coating films can be approximated. As a result, the appearance of the obtained multilayer coating film is improved.

The melamine resin used in the intermediate coating composition in the present embodiment preferably contains the alkyl-etherized melamine resin that has imino groups per one triazine nucleus at the number of less than 1.0 by average and the number average molecular weight of less than 1000. The alkyl-etherized melamine resin that has imino groups per one triazine nucleus at the number of less than 1.0 by average and the number average molecular weight of less than 1000 can be prepared by making formaldehyde react with a part of the amino groups of melamine (2,4,6-triamino-1,3,5-triazine) to methylolate, followed by alkyl-etherizing a part of obtained methylol groups with alcohol.

Melamine has three amino groups (—NH2) bonded to carbon atoms of the triazine nucleus that constitutes the melamine. Since formaldehyde can be added to two hydrogen atoms that constitute the amino group, theoretically, 6 moles of formaldehyde can be added to 1 mole of melamine, thus, 6 methylol groups can be introduced into one triazine nucleus. Thus, when alcohol is made to react with the methylol groups introduced in the melamine, the melamine is alkyl-etherized.

In the present embodiment, the methylolation with formaldehyde is performed such that all hydrogen atoms of the amino groups of the melamine are not reacted and methylolized but hydrogen atoms are reacted to the extent where imino groups (—NH—CH$_2$OR; here, R represents H or alkyl group) remain less than 1.0, preferably 0.01 to 0.5 by average per one triazine nucleus. When the number of the imino groups in the above alkyl-etherized melamine resin is 1.0 or more per one triazine nucleus, the storage stability of the intermediate coating composition itself may degrade. A content of the imino groups is preferably from 0.01 to 0.5 per one triazine nucleus from the viewpoint of improving the appearance of the multilayer coating film.

In the alkyl etherization, as an alcohol that is reacted with the methylol group introduced into the melamine, a monovalent alcohol having 1 to 4 carbon atoms is used. Examples of such alcohols include methyl alcohol, ethyl alcohol, propyl alcohol, isopropyl alcohol, n-butyl alcohol, and isobutyl alcohol. The alcohol that is used in the above alkyl-etherization reaction may be one kind, or two or more kinds may be used together. Two kinds of alcohols, for example, methyl alcohol and butyl alcohol may be used to perform alkyl etherization. The above methylolation reaction and alkyl etherization reaction may be performed according to conventional methods. Further, a system that uses methyl alcohol or a combination of methyl alcohol and butyl alcohol is preferable for the alkyl etherization from the viewpoint of the appearance of the coating film when the coating film is formed.

The alkyl-etherized melamine resin that has imino groups per one triazine nucleus at the number of less than 1.0 by average and the number average molecular weight of less than 1000 has preferably a ratio of methyl groups/butyl groups in an alkyl-etherized part of from 50/50 to 100/0 by mole ratio. When the ratio of methyl groups/butyl groups falls below 50/50, the appearance may degrade when the coating film is formed. The ratio of methyl groups/butyl groups is more preferably from 55/45 to 100/0, and still more preferably from 60/40 to 100/0.

Thus prepared alkyl-etherized melamine resin that has imino groups per one triazine nucleus at the number of less than 1.0 by average is made to have the number average molecular weight of less than 1000. When the number average molecular weight is 1000 or more, the smoothness when the coating film is formed degrades. The above number average molecular weight is preferably from 300 to 900 and more preferably from 400 to 700.

While the applications of the above alkyl-etherized melamine resin have various advantages, there is a difficulty such that the above alkyl-etherized melamine resin is difficult to cause a sufficient curing reaction with a hydroxyl-containing coating film forming resin (the hydroxyl-containing acrylic resin emulsion and, as needed, a hydroxyl-containing polyester resin) under a condition of a low temperature curing generally. Therefore, in the intermediate coating composition, the other melamine resin detailed below is preferably used together with the above alkyl-etherized melamine resin. When the above alkyl-etherized melamine resin and the other melamine resin are used together, a content ratio of the above alkyl-etherized melamine resin and the other melamine resin is particularly preferably from 10/90 to 45/55.

In the intermediate coating composition in the present embodiment, a melamine resin other than the above alkyl-etherized melamine resin that has imino groups per one triazine nucleus at the number of less than 1.0 by average and the number average molecular weight of less than 1000 may be further contained. As the other melamine resin, melamine resins that have imino groups per one triazine nucleus at the number of 1.0 or more by average and the number average molecular weight of from 500 to 2500 can be used.

In the other melamine resins, when the number of the imino groups is less than 1.0 per one triazine nucleus, the curability of the intermediate coating composition may degrade. The content of the above imino groups is preferably from 1.2 to 2.5 per one triazine nucleus from the viewpoint of physical properties of the coating film when the coating film is formed. When the above number average molecular weight is less than 500, the curability when the coating film is formed may degrade, and when exceeding 2500, the appearance of the coating film may degrade. The number average molecular weight is preferably from 550 to 1200, and more preferably from 600 to 1100. Thus, when the above alkyl-etherized melamine resin and the other melamine resin are used together, excellent reaction curability of the intermediate coating film can be secured, and excellent coating film physical properties of a multilayer coating film to be formed can be secured.

A total content of the melamine resin contained in the intermediate coating composition is preferably from 10 to 50% by mass and more preferably from 15 to 40% by mass, per the coating composition resin solid content. When the content of the melamine resin is less than 10% by mass, the water resistance of the obtained coating film may degrade. Further, when the content of the melamine resin exceeds 50% by mass, the chipping resistance of the obtained coating film may degrade. In the present specification, as the number average molecular weight, a value measured by GPC (gel permeation chromatogram) and calculated in terms of polystyrene polymer molecular weight is used.

The intermediate coating composition may further contain a resin component other than the above resin components. Although a resin component that may be contained is not particularly limited, for example, a polyester resin, an aqueous acrylic resin, a polyether resin and an epoxy resin can be used. Among these, a hydroxyl-containing polyester resin is more preferably used.

As for the hydroxyl-containing polyester resin, an oil-free polyester resin obtained by condensation of a polyalcohol component and a polybasic acid component, or an oil-modified polyester resin obtained by adding, in addition to the polyalcohol component and the polybasic acid component, an oil component that is a mixture of one kind or two or more kinds of castor oil, dehydrated castor oil, wood oil, safflower oil, soy oil, linseed oil, tall oil, and coconut oil to the polybasic acid component and polyalcohol component, followed by reacting three components can be used. Further, polyester resins obtained by grafting the acrylic resin or vinyl resin can be also used. Further, a urethane-modified polyester resin obtained by reacting a polyisocyanate compound with a polyester resin obtained by reacting the polyalcohol component and the polybasic acid component can be also used.

Examples of the polyalcohol components usable in the hydroxyl-containing polyester resin include: diols such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxy pivalic acid neopentyl glycol ester, 2-butyl-2-ethyl-1,3-propanediol, 3-methyl-1,5-pentanediol, 2,2,4-trimethylpentanediol, and hydrogenated bisphenol A; tri- and higher-valent polyol components such as trimethylol propane, trimethylol ethane, glycerin, and pentaerythritol; and hydroxyl carbonic acid components such as 2,2-dimethylol propionic acid, 2,2-dimethylol butanoic acid, 2,2-dimethylol pentanoic acid, 2,2-dimethylol hexanoic acid and 2,2-dimethylol octanoic acid.

Examples of the polybasic acids usable in the hydroxyl-containing polyester resins include: polybasic acid components and anhydrides thereof such as aromatic polycarboxylic acids and acid anhydrides such as phthalic anhydride, isophthalic acid, terephthalic acid, trimellitic anhydride, tetrabromophthalic anhydride, tetrachlorophthalic anhydride, and pyromellitic anhydride; alicyclic polycarboxylic acids and anhydrides such as hexahydrophthalic anhydride, tetrahydrophthalic anhydride, and 1,4- and 1,3-cyclohexane dicarboxylic acid; and aliphatic polycarboxylic acids and anhydrides such as maleic anhydride, fumaric acid, succinic anhydride, adipic acid, sebacic acid, and azelaic acid. As needed, a mono-basic acid such as succinic acid or t-butyl succinic acid may be used together.

When the hydroxyl-containing polyester resin is prepared, as the reaction component, further, monovalent alcohol, monoepoxide compounds such as CARDURA E (trade name, manufactured by Shell Chemical Japan), and lactones (beta-propiolactone, dimethyl propiolactone, butyrolactone, gamma-valerolactone, epsilon-caprolactone, gamma-caprolactone, gamma-caprylolactone, crotolactone, delta-valerolactone, and delta-caprolactone) may be used together. The lactones, in particular, are useful for performing a ring-opening addition to a polyester chain of polycarboxylic acid and polyalcohol to form itself a polyester chain, further, for improving the chipping resistance of the composition of the intermediate coating composition. These may be contained in an amount of preferably from 3 to 30%, and more preferably from 5 to 20%, particularly preferably from 7 to 15% of the total mass of all reaction components.

The above hydroxyl-containing polyester resins can be readily rendered water-soluble by adjusting its acid value and by neutralizing (for example, 50% or more) the carboxyl groups with a basic substance. Examples of these basic substances used here include ammonia, methylamine, ethylamine, dimethylamine, diethylamine, trimethylamine, triethylamine, dimethyl ethanolamine, diethanolamine, and triethanolamine, and among these, diethanolamine, dimethyl ethanolamine, and triethanolamine are preferred. Further, a neutralization rate at the time of the above neutralization is, without particularly limiting, for example, 80 to 120%.

The number average molecular weight (Mn) of the above hydroxyl-containing polyester resin is preferably from 800 to 10000 and more preferably from 1000 to 8000. When the number average molecular weight is less than 800, the stability when the polyester resin is dispersed in water may degrade. Further, when the number average molecular weight exceeds 10000, the viscosity of the resin increases. Therefore, the solid concentration when the coating composition is formed decreases and the coating workability may degrade.

The hydroxyl value of the above hydroxyl-containing polyester resin (solid content) is preferably from 5 to 150 mg KOH/g and more preferably from 30 to 130 mg KOH/g. When the hydroxyl value is less than 5 mg KOH/g, the curability of the obtained coating film may degrade. Further, when the hydroxyl value exceeds 150 mg KOH/g, the chipping resistance of the coating film may degrade.

The above hydroxyl-containing polyester resin has the acid value (solid content) of preferably from 5 to 50 mg KOH/g and more preferably from 10 to 45 mg KOH/g. When the acid value is less than 5 mg KOH/g, the water dispersion stability of the hydroxyl-containing polyester resin may degrade. Further, when the acid value exceeds 50 mg KOH/g, the water resistance of the obtained coating film may degrade.

Further, the glass transition temperature of the above hydroxyl-containing polyester resin is preferably from −40 to 50° C. When the above glass transition temperature is lower than −40° C., the hardness of the obtained coating film may degrade, and, when exceeding 50° C., the base hiding property may degrade. The glass transition temperature is more preferably from −40 to 10° C. The glass transition temperature can be measured using a differential scanning calorimeter (DSC) or the like.

The content when the intermediate coating composition contains the hydroxyl-containing polyester resin is preferably from 5 to 80% by mass and more preferably from 20 to 75% by mass per a mass of the resin solid content contained in the intermediate coating composition. When the content of the hydroxyl-containing polyester resin exceeds 80% by mass, the physical properties of the obtained coating film may degrade. Further, when the content of the hydroxyl-containing polyester resin is less than 5% by mass, the storage stability of the intermediate coating composition may degrade.

[Other Components]

The intermediate coating composition may contain other pigments than the above photoluminescent pigment and colored pigment. As for the other pigments, the extender and the like can be used. As for the extender, for example, calcium carbonate, barium sulfate, clay, talc or the like can be used.

Further, the intermediate coating composition may contain a viscosity control agent as another additive with the intention of preventing the intermediate coat from becoming familiar with a base coating film described below, securing excellent workability, and controlling orientation of the photoluminescent pigment. As for the viscosity control agent, a viscosity control agent having a thixotropic property can be generally used. Examples of the viscosity control agents having a thixotropic property include polyamide-based materials such as crosslinked or non-crosslinked resin particles, a swelling dispersion of aliphatic acid amide, amide-based aliphatic acid, and phosphates of long-chain polyaminoamides; polyethylene-based materials such as a colloidal swelling dispersion of polyethylene oxide; organic bentonite-based materials such as organic acid smectite clay and montmorillonite; inorganic pigments such as aluminum silicate and barium sulfate; and flaky pigments capable of developing viscosity depending on a shape of the pigment.

Further, the intermediate coating composition may contain, other than the above components, additives usually added to the coating composition such as a surface conditioner, a thickener, an antioxidant, an anti-UV agent and a defoamer. The compounding amounts thereof are within conventionally well-known ranges.

A method of preparing the intermediate coating composition having the above composition is not particularly limited, and a conventional well-known method can be used to prepare. Specifically, the intermediate coating composition can be prepared by kneading and dispersing the above respective components using a kneader or a roller.

<First Pre-Heating Step>

In the present embodiment, a first pre-heating step may be disposed. The first pre-heating step is a step of pre-heating an uncured intermediate coating film formed in the intermediate coating composition application step. Here, in the present embodiment, the "uncured" means a state that is not completely cured.

In the present step, the uncured intermediate coating film is heated at a low temperature to the extent that does not proceed the curing reaction of the intermediate coating film to remove a volatile component such as a solvent in the intermediate coating film. Specifically, the pre-heating is performed at from 60 to 110° C. for from 3 to 10 minutes.

Further, in the present step, the intermediate coating film is pre-heated to control the orientation of the photoluminescent pigment having a small particle size and a thin film shape compounded in the intermediate coating film. Specifically, as a result of volume shrinkage of the intermediate coating film by the pre-heating of the present step, more surely, the photoluminescent pigment having a small particle size and a thin film shape can be oriented thinly in juxtaposition in a state where its surface direction is in parallel with an object to be coated. Thus, a high hiding property of the intermediate coating film can be secured more surely, and the light transmittance can be surely reduced to 0.25% or less. As a result, a more excellent feeling of depth can be obtained. Thus, an amount of light that reaches the electrodeposition coating film can be surely reduced. As a result, the peeling in an interface between the intermediate coating film and the electrodeposition coating film can be more surely avoided.

A film thickness of the intermediate coating film is preferably from 20 to 60 μm in a dry state. A coating amount of the intermediate coat is adjusted in the intermediate coating composition application step such that the film thickness of the intermediate coating film is within this range. A more preferable film thickness is from 30 to 40 μm.

<Base Coating Composition Application Step>

A base coating composition application step is a step of forming an uncured base coating film by coating a base coating composition on the uncured intermediate coating film. As a coating method, an electrodeposition coating method is preferably used.

As for the base coating composition, an aqueous base coating composition containing the colored pigment and the coating film forming resin is used. The coating film forming resin preferably contains the acrylic emulsion resin, the polyether polyol, the urethane emulsion resin and the curing agent.

The base coating film formed from the base coating composition preferably has the 25° L* value of 60 or smaller and the 25° C.* value of 30 or larger. When the base coating film has the L* value of 60 or smaller and the 25° C.* value of 30 or larger, a multilayer coating film having an excellent feeling of depth and high saturation can be obtained. Therefore, in the base coating composition, the kinds and amounts of the colored pigments described below are adjusted such that the base coating film has the 25° L* value of 60 or smaller and the 25° C.* value of 30 or larger.

[Colored Pigment]

Any of organic-based and inorganic-based colored pigments can be used as the colored pigments compounded in the base coating composition. Examples of the organic colored pigments include azo chelate-based pigments, insoluble azo-based pigments, condensation azo-based pigments, diketopyrrolopyrrole-based pigments, benzimidazolone-based pigments, phthalocyanine-based pigments, indigo pigments, perinone-based pigments, perylene-based pigments, dioxane-based pigments, quinacridone-based pigments, isoindolinone-based pigments, and metal complex pigments. Further, examples of the inorganic pigments include chrome yellow, yellowish iron oxide, colcothar, carbon black, and titanium oxide. The colored pigment compounded in the base coating composition is selected such that the base coating film have the same shade as the above intermediate coating film A content of the colored pigment in the base coating composition is preferably from 1 to 30% by mass in terms of pigment mass concentration (PWC) in the base coating composition. When the PWC of the colored pigment is within this range, a multilayer coating film having an excellent feeling of depth and high saturation can be obtained. The PWC is more preferably from 5 to 10% by mass.

The PWC of the colored pigment is a ratio of a mass of all colored pigments to a total mass of all pigments including pigments other than colored pigments described below and all resin components and is calculated according to the following formula (3).

PWC of colored pigments=(a total mass of all colored pigments)/(a total mass of all pigments and solid contents of all resin components in base coating composition)×100(% by mass)    formula (3)

[Acrylic Emulsion Resin]

Various types obtained by emulsion polymerizing an alpha, beta-ethylenically unsaturated monomer mixture can be preferably used as the acrylic emulsion resin compounded as the coating film forming resin of the base coating composition. For example, an acrylic emulsion resin that is obtained by emulsion polymerizing the alpha, beta-ethylenically unsaturated monomer mixture that contains 65% by mass or more of a (meth)acrylic acid ester monomer having one or two carbons in an ester part of a side chain and has an acid value of from 3 to 50 mg KOH/g can be used.

An appearance of the obtained coating film degrades when a content of the (meth)acrylic acid ester monomer having one or two carbons in an ester part of a side chain is less than 65% by mass in the alpha, beta-ethylenically unsaturated monomer mixture. (Meth)acrylic acid methyl and (meth)acrylic acid ethyl can be used as the (meth)acrylic acid ester having one or two carbons in the ester part of the side chain.

The alpha, beta-ethylenically unsaturated monomer mixture has the acid value of preferably from 3 to 50 mg KOH/g and more preferably from 7 to 40 mg KOH/g. The workability may degrade when the acid value is less than 3 mg KOH/g and water resistance of the coating film may degrade when the acid value exceeds 50 mg KOH/g.

Further, the alpha, beta-ethylenically unsaturated monomer mixture has a hydroxyl value of preferably from 10 to 150 mg KOH/g and more preferably from 20 to 100 mg KOH/g. Sufficient curability may not be obtained when the hydroxyl value is less than 10 mg KOH/g, and the water resistance of the coating film may degrade when the hydroxyl value exceeds 150 mg KOH/g.

The alpha, beta-ethylenically unsaturated monomer mixture can be adjusted to the above preferable acid value and hydroxyl value by adjusting the content of the alpha, beta-ethylenically unsaturated monomer having an acid group or a hydroxyl group.

Further, a glass transition temperature of the acrylic emulsion resin obtained by polymerizing the alpha, beta-ethylenically unsaturated monomer mixture is preferably within a range of from −20 to 80° C. from the viewpoint of the physical properties of the coating film.

Examples of acid-containing alpha, beta-ethylenically unsaturated monomers include acrylic acid, methacrylic acid, an acrylic acid dimer, crotonic acid, 2-acryloyloxyethyl phthalic acid, 2-acryloyloxyethyl succinic acid, 2-acryloyloxyethyl acid phosphate, 2-acrylamide-2-methylpropane sulfonic acid, omega-carboxy-polycaprolactone mono (meth)acrylate, isocrotonic acid, alpha-hydro-omega-((1-oxo-2-propenyl)oxy) poly (oxy (1-oxo 1,6-hexanediyl)), maleic acid, fumaric acid, itaconic acid, 3-vinyl salicylic acid, and 3-vinyl acetylsalicylic acid. Among these, acrylic acid, methacrylic acid, and acrylic acid dimer can be particularly preferably used.

Examples of hydroxyl-containing alpha, beta-ethylenically unsaturated monomers include adducts of hydroxyethyl (meth)acrylate, hydroxypropyl (meth)acrylate, hydroxybutyl (meth)acrylate, allyl alcohol, (meth)acryl alcohol, and hydroxyethyl (meth)acrylate with epsilon-caprolactone. Among these, hydroxyethyl (meth)acrylate, hydroxybutyl (meth)acrylate, and an adduct of hydroxyethyl (meth)acrylate and epsilon-caprolactone are particularly preferably used.

The above alpha, beta-ethylenically unsaturated monomer mixture may further contain less than 35% by mass of other alpha, beta-ethylenically unsaturated monomers. Examples of other alpha, beta-ethylenically unsaturated monomers include (meth)acrylic acid esters that have 3 or more carbons in an ester part of a side chain (for example, n-butyl (meth)acrylate, isobutyl (meth)acrylate, t-butyl (meth)acrylate, 2-ethylhexyl (meth)acrylate, lauryl methacrylate, phenyl acrylate, isobornyl (meth)acrylate, cyclohexyl methacrylate, t-butylcyclohexyl (meth)acrylate, dicyclopentadienyl (meth)acrylate and dihydrodicyclopentadienyl (meth)acrylate), polymerizable amide compounds (for example, (meth) acrylamide, N-methylol (meth)acrylamide, N,N-dimethyl (meth)acrylamide, N,N-dibutyl(meth)acrylamide, N,N-dioctyl(meth)acrylamide, N-monobutyl(meth)acrylamide, N-monooctyl(meth)acrylamide 2,4-dihydroxy-4'-vinyl benzophenone, N-(2-hydroxyethyl)acrylamide, and N-(2-hydroxyethyl)methacrylamide), polymerizable aromatic compounds (for example, styrene, alpha-methylstyrene, vinyl ketone, t-butylstyrene, parachlorostyrene, and vinylnaphthalene); polymerizable nitriles (for example, acrylonitrile, and methacrilonitrile); alpha-olefins (for example, ethylene, and propylene); vinyl esters (for example, vinyl acetate, and vinyl propionate; and dienes (for example, butadiene, and isoprene). These are selected depending on an object. However, (meth)acrylamide is preferably used from the viewpoint of providing hydrophilicity.

The alpha, beta-ethylenically unsaturated monomer mixture can be emulsion polymerized according to a known method. Specifically, an emulsion polymerization is performed by dropping the alpha, beta-ethylenically unsaturated monomer mixture and a polymerization initiator while heating and stirring after an emulsifier is dissolved in water or an aqueous medium containing, as needed, an organic solvent such as alcohol. At this time, the alpha, beta-ethylenically unsaturated monomer mixture may be dropped after emulsifying in advance with the emulsifier.

Examples of the polymerization initiators include: azo-based oily compounds (for example, azobisisobutyronitrile, 2,2'-azobis (2-methylbutyronitrile), and 2,2'-azobis (2,4-dimethylvaleronitrile)); azo-based aqueous compounds (for example, anion-based 4,4'-azobis (4-cyanovaleric acid) and cation-based 2,2'-azobis(2-methylpropionamidin)); redox-based oily peroxides (for example, benzoyl peroxide, parachlorobenzoyl peroxide, lauroyl peroxide, and t-butyl par benzoate); and aqueous peroxides (for example, potassium persulfate and ammonium persulfate).

Known emulsifiers are used as the emulsifier. Among these, reactive emulsifiers, for example, Antox MS-60 (manufactured by NIPPON NYUKAZAI CO., LTD.), Eleminol JS-2 (manufactured by Sanyo Chemical Industries, Ltd.), ADEKA REASOAP NE-20 (manufactured by ADEKA, Inc.), Aqualon HS-10 (manufactured by Dai-Ichi Kogyo Seiyaku Co., Ltd.), and the like can be particularly preferably used.

Further, a chain transfer agent such as mercaptan such as lauryl mercaptan and an alpha-methylstyrene dimer may be used, as needed, to adjust a molecular weight of the acrylic emulsion resin.

A reaction temperature is determined by the initiator. For example, it is preferably from 60 to 90° C. for the azo-based initiator, and from 30 to 70° C. for the redox-based initiator. A reaction time is preferably from 1 to 8 hours. An amount used of the initiator to a total amount of the alpha, beta-ethylenically unsaturated monomer mixture is preferably from 0.1 to 5% by mass, and more preferably from 0.2 to 2% by mass.

The above emulsifying polymerization can be performed in two stages. That is, first, a part of the alpha, beta-ethylenically unsaturated monomer mixture (alpha, beta-ethylenically unsaturated monomer mixture 1) is emulsion polymerized, and a remainder of the alpha, beta-ethylenically unsaturated monomer mixture (alpha, beta-ethylenically unsaturated monomer mixture 2) may be further added therein to perform the emulsion polymerization.

In order to form a coating film having an excellent design property, the alpha, beta-ethylenically unsaturated monomer mixture 1 contains preferably an alpha, beta-ethylenically unsaturated monomer having an amide group. Further, at this time, it is preferable that the alpha, beta-ethylenically unsaturated monomer mixture 2 does not contain the alpha, beta-ethylenically unsaturated monomer having an amide group.

A particle size of the acrylic emulsion resin is preferably within a range of from 0.01 to 1.0 μm. When the particle size is less than 0.01 μm, the workability may degrade, and when the particle size exceeds 1.0 μm, the appearance of the obtained coating film may degrade. The particle size of the acrylic emulsion resin can be adjusted by adjusting, for example, a monomer composition or conditions of the emulsifying polymerization. In the present specification, the particle size means a volume average particle size measured by a laser light scattering method.

The acrylic emulsion resin is used preferably within a range of pH of from 5 to 10, as needed, by neutralizing with a base from the viewpoint of stability. The neutralization is performed by adding a tertiary amine like dimethyl ethanolamine or trimethylamine before or after the emulsifying polymerization.

A content of the acrylic emulsion resin in the base coating composition is preferably from 15 to 40%, and more preferably from 20 to 35% as a solid concentration to the solid content of the base coating composition.

[Polyether Polyol]

A polyether polyol having 0.02 or more of primary hydroxyl groups by average in one molecule and a number average molecular weight of from 300 to 3000 is preferably used as the polyester polyol compounded as the coating film forming resin of the base coating composition. By containing such polyether polyol, the flip-flop property, water resistance and chipping resistance of the coating film can be improved. In the present specification, the number average molecular weight means a number average molecular weight in terms of polystyrene measured by GPC (gel permeation chromatography).

When the number of the primary hydroxyl groups contained in one molecule of the polyether polyol is less than 0.02 groups on average, the water resistance and the chipping resistance of the coating film degrade. The number of the primary hydroxyl groups contained in one molecule is preferably 0.04 or more and more preferably 1 or more. Other than the primary hydroxyl group, the number of hydroxyl groups including secondary and tertiary hydroxyl groups is preferably 2 or more in one molecule from the viewpoint of the water resistance and chipping resistance of the coating film.

Here, the hydroxyl value of the polyether polyol is preferably from 30 to 700 mg KOH/g. When the hydroxyl value is less than 30 mg KOH/g, the curability may degrade to result in degradation of the water resistance and chipping resistance of the coating film. Further, when the hydroxyl value exceeds 700 mg KOH/g, the stability of the coating composition and the water resistance of the coating film may degrade. A particularly preferable hydroxyl value is from 50 to 500 mg KOH/g.

Further, when the number average molecular weight of polyether polyol is less than 300, the water resistance of the coating film may degrade, and when the number average molecular weight exceeds 3000, the curability and chipping resistance of the coating film may degrade. The particularly preferable number average molecular weight is from 400 to 2000.

A content of the polyether polyol in the base coating composition is preferably from 1 to 40% by mass and more preferably from 3 to 30% by mass per resin solid content of the base coating composition. When the content of polyether polyol is less than 1% by mass, the appearance of the coating film may degrade, and, when the content exceeds 40% by mass, the water resistance and chipping resistance of the coating film may degrade.

Examples of the polyether polyols include compounds in which alkylene oxide is added to an active hydrogen-containing compound such as polyalcohol, polyphenol and polycarboxylic acids. Examples of the active hydrogen-containing compounds includes water, polyalcohols (divalent alcohols such as ethylene glycol, diethylene glycol, trimethylene glycol, propylene glycol, 1,4-buthanediol, 1,6-hexanediol, neopentyl glycol, 1,4-dihydroxymethylcyclohexane and cyclohexylene glycol); trivalent alcohols such as glycerin, trioxyisobutane, 1,2,3-butanetriol, 1,2,3-pentanetriol, 2-methyl-1,2,3-propanetriol, 2-methy-2,3,4-butanetriol, 2-ethyl-1,2,3-butanetriol, 2,3,4-pentaneetriol, 2,3,4-hexanetriol, 4-propyl-3,4,5-heptantriol, 2,4-dimethyl-2,3,4-pentantriol, pentamethyl glycerin, pentaglycerin, 1,2,4-butanetriol, 1,2,4-pentantriol, trimethylol ethane and trimethylol propane; tetravalent alcohols such as pentaerythritol, 1,2,3,4-pentanetetrol, 2,3,4,5-hexanetetrol, 1,2,4,5-pentanetetrol, 1,3,4,5-hexanetetrol, diglycerine and sorbitan; pentavalent alcohols such as adonitol, arabitol, xylitol and triglycerine; hexavalent alcohols such as dipentaerythritol, sorbitol, mannitol, iditol, inositol, dulcitol, talose and allose; octavalent alcohols such as sucrose; and polyglycerine); polyphenols [polyphenol (pyrogallol, hydroquinone, and phloroglucin), bisphenols (bisphenol A and bisphenol sulfone)]; polycarboxylic acid [aliphatic polycarbonic acid (succinic acid, adipic acid and the like), aromatic polycarboxylic acid (phthalic acid, terephthalic acid, trimelytic acid and the like)]; and mixtures of two or more kinds thereof.

The polyether polyol can be obtained according to a conventional method by adding alkylene oxide to the active hydrogen-containing compound under the presence of an alkali catalyst under normal pressure or increased pressure and under a temperature condition of from 60 to 160° C. Alkylene oxides such as ethylene oxide, propylene oxide and butylene oxide can be used as the alkylene oxide, and these can be used singularly or in a combination of two or more kinds thereof. An addition form when two or more kinds thereof are used together may be any one of a block polymerization or a random polymerization.

As for the polyether polyol, a commercially available product can be used. For example, Prime Pole PX-1000, Sun Knicks SP-750, PP-400 (all are manufactured by SANYO CHEMICAL INDUSTRIES LTD.), and PTMG-650 (manufactured by MITSUBISHI CHEMICAL CORPORATION) can be used as the polyether polyol.

[Urethane Emulsion Resin]

As a urethane emulsion resin compounded as the coating film forming resin of the base coating composition, a urethane emulsion resin obtained, for example, as shown below can be used. First, a urethane prepolymer is generated by making diisocyanate react with glycol having at least 2 active hydrogen or glycol having a carboxylic group at a NCO/OH equivalence ratio of from 0.5 to 2.0. Then, a chain is extended by a chain extender by neutralizing the generated urethane prepolymer with a neutralizing agent. Thereafter, when a cationic, nonionic or anionic surfactant and ion exchange water are added followed by dispersing, the urethane emulsion resin is obtained.

For example, aliphatic, alicyclic or aromatic diisocyanate can be used as the above diisocyanate. Specifically, 2,4-tolylene diisocyanate, 2,6-tolylene diisocyanate, 4,4'-diphenylmethane diisocyanate, m-phenylene diisocyanate, xylylene diisocyanate, tetramethylene di-isocyanate, hexamethylene di-isocyanate, metaxylene diisocyanate, lysine diisocyanate, 1,4-cyclohexylene diisocyanate, 4,4'-dicyclohexylmethane diisocyanate, 3,3'-dimethyl-4, 4'-biphenylene di-isocyanate, 3,3'-dimethoxy-4,4'-biphenylene di-isocyanate, 1,5-naphthalene diisocyanate, 1,5-tetrahydronaphthalene diisocyanate, isophorone diisocyanate, and derivatives thereof are used.

Examples of a glycol having the above active hydrogen include low molecular weight glycols such as ethylene glycol, diethylene glycol, triethylene glycol, 1,2-propylene glycol, trimethylene glycol, 1,3-butylene glycol, tetramethylene glycol, hexamethylene glycol, hydrogenated bisphenol A, and ethylene oxide or propylene oxide adducts of bisphenol A; polyoxypropylene glycols; adducts of polyoxypropylene and glycerin, adducts of polyoxypropylene and trimethylolpropane, adducts of polyoxypropylene and 1,2,6-hexanetriol, adducts of polyoxypropylene and pentaerythrit, adducts of polyoxypropylene and sorbitol, methylene-bis-phenyl diisocyanate, polytetrafuranpolyether extended with hydrazine, and derivatives thereof.

Further, polyesters and polycaprolactone that are condensates between adipic acid or phthalic acid, and ethylene glycol, propylene glycol, 1,3-butylene glycol, 1,4-butylene glycol, diethylene glycol, hexandiol, 1,2,6-hexanetriol, trimethylolpropane or 1,1,1-trimethylolethane can be also used.

For example, 2,2-dimethylol propionic acid, 2,2-dimethylolbutanoic acid, 2,2-dimethylolvaleric acid and the like can be used as a glycol having the above carboxylic acid group.

As for the above neutralizing agent, for example, amines such as trimethylamine, triethylamine, tri-n-propylamine, tributylamine and triethanolamine, sodium hydroxide, potassium hydrate and ammonia can be used.

Examples of the above-mentioned chain extender include polyols such as ethylene glycol and propylene glycol; aliphatic, alicyclic or aromatic diamines such as ethylenediamine, propylenediamine, hexamethylenediamine, tolylenediamine, xylylene diamine, diphenyldiamine, diaminodiphenylmethane, diaminocyclohexylmethane, piperazine, 2-methylpiperazine, 1,2-bis(2-cyano ethylamino) ethane and isophoronediamine; and water.

As for the above urethane emulsion resin, a commercially available product can be used. Specifically, "VonDick" series and "HYDRAN" series manufactured by DIC Corporation, "IMPRANIL" series manufactured by Bayer Material, and "NeoRez" series such as NeoRez R-940, R-941, R-960, R-962, R-966, R-967, R-962, R-9603, R-9637, R-9618, R-9619 and XR-9624 manufactured by Avecia Resins, "UCOAT", "UPRENE" and "PERMARIN" series, manufactured by Sanyo Chemical Industries, and "ADEKA BONTIGHTER" series manufactured by ADEKA can be used. These urethane emulsion resins may be used singularly or in a combination of 2 types or more.

A content of the urethane emulsion resin is preferably from 3 to 30 parts by mass per 100 parts by mass of the resin solid content of the base coating composition. An adhesive property or the like may degrade when the content of the urethane emulsion resin is less than 3 parts by mass, and the storage stability of the coating composition may degrade when the content exceeding 30 parts by mass. Particularly preferably, the content of the resin is from 10 to 25 parts by mass.

[Curing Agent]

As a curing agent compounded as the coating film forming resin of the base coating composition, curing agents used in the coating composition in general can be used. Amino resins and block isocyanates are preferably used from the viewpoint of various performances and cost of the obtained coating film.

As for amino resins, other than dimethyl ethanolamine or the like for example, an aqueous melamine resin or a nonaqueous melamine resin can be used. As for these melamine resins, commercially available products can be used. For example, Cymel 204 or the like manufactured by Mitsui Chemical Cytec Ltd. can be used.

As a block isocyanate, a product obtained by adding a blocking agent having active hydrogen to polyisocyanate such as trimethylene diisocyanate, hexamethylene di-isocyanate, xylylene diisocyanate, and isophorone diisocyanate can be used. The block isocyanate, upon heating, dissociates the blocking agent and generates an isocyanate group and this group reacts with a functional group in a resin component to cure the resin.

The content of the curing agent in the base coating composition is preferably from 15 to 100 parts by mass and more preferably from 15 to 35 parts by mass per 100 parts by mass of the resin solid content in the base coating composition. The curing property may degrade when the content of the curing agent is less than 15 parts by mass, and the adhesive property and the hot water resistance may degrade when the content exceeds 100 parts by mass.

Further, a total content of the curing agent and the above urethane emulsion resin is preferably from 30 to 60 parts by mass per 100 parts by mass of a coating composition resin solid content. When the total content of the curing agent and urethane emulsion resin is less than 30 parts by mass, the coating workability may degrade, and when the total content exceeds 60 parts by mass, the storage stability of the coating composition may degrade. Particularly preferably, the total content is from 30 to 55 parts by mass.

[Other Components]

As needed, the base coating composition may contain other components. For example, the base coating composition may contain, other than the above acrylic emulsion resin, polyether polyol, urethane emulsion resin and curing agent, other coating film forming resin such as an acrylic resin, a polyester resin, an alkyd resin, and an epoxy resin.

The above other coating film forming resin has the number average molecular weight of preferably from 3000 to 50000 and more preferably from 6000 to 30000. When the number average molecular weight is smaller than 3000, the coating workability and curing property may become insufficient. When the number average molecular weight exceeds 50000, a nonvolatile portion becomes too insufficient during coating and, by contrast, the coating workability may degrade.

The above other coating film forming resin has the acid value of preferably from 10 to 100 mg KOH/g and more preferably from 20 to 80 mg KOH/g. When the acid value exceeds 100 mg KOH/g, the water resistance of the coating film may degrade, and, when the acid value is less than 10 mg KOH/g, the water dispersibility of the resin may degrade.

Further, the above other coating film forming resin has the hydroxyl value of preferably from 20 to 180 mg KOH/g, and more preferably from 30 to 160 mg KOH/g. When the hydroxyl value exceeds 180 mg KOH/g, the water resistance of the coating film may degrade, and when the hydroxyl value is less than 20 mg KOH/g, the curability of the coating film may degrade.

A compounding ratio of the above other coating film forming resin and the above acrylic emulsion resin is preferably from 5 to 95% by mass, more preferably from 10 to 85% by mass, and still more preferably from 20 to 70% by mass of the acrylic emulsion resin to a total amount of the solid contents of both resins. That is, the above other coating film forming resin is preferably from 95 to 5% by mass, more preferably from 90 to 15% by mass, and still more preferably from 80 to 30% by mass, to the total amount of the solid contents of the both resins. When the ratio of the acrylic emulsion resin is less than 5% by mass, the dripping cannot be prevented from occurring, and the appearance of the coating film may degrade, and when exceeding 95% by mass, the appearance of the coating film may degrade.

Further, the base coating composition may contain a viscosity control agent as another additive with the intention of preventing the base coat from becoming familiar with the clear coating film described below and of securing excellent coating workability. As for the viscosity control agent, a viscosity control agent having a thixotropic property can be generally used. Examples of the viscosity control agents having a thixotropic property include polyamide-based materials such as crosslinked or non-crosslinked resin particles, a swelling dispersion of aliphatic acid amide, amide-based aliphatic acid, and phosphates of long-chain polyaminoamide; polyethylene-based materials such as a colloidal swelling dispersion of polyethylene oxide; organic bentonite-based materials such as organic acid smectite clay and montmorillonite; inorganic pigments such as aluminum silicate and barium sulfate; and flat pigments capable of developing viscosity depending on a shape of the pigment.

Further, the base coating composition may contain, other than the above components, additives usually added to the coating composition such as a surface conditioner, a thickener, an antioxidant, an anti-UV agent and a defoamer. The compounding amounts thereof are within known ranges.

A method of preparing the base coating composition having the above composition is not particularly limited, and a known method can be used to prepare. Specifically, the base coating composition can be prepared by kneading and dispersing the above respective components using a kneader or a roller.

The base coating composition is prepared the same as the above intermediate coating composition according a known method.

<Second Pre-Heating Step>

In the present embodiment, a second pre-heating step may be disposed. The second pre-heating step is a step of pre-heating the uncured base coating film formed in the base coating composition application step.

In the present step, the intermediate coating film and the base coating film are heated at a low temperature to the extent that does not proceed the curing reaction to remove a volatile component such as a solvent in the base coating film. Specifically, the pre-heating is performed at a temperature of from 60 to 100° C. for from 3 to 10 minutes.

A film thickness of the base coating film is preferably from 5 to 35 µm and more preferably from 10 to 25 µm in a dry state. When the film thickness of the base coating film is within this range, a multilayer coating film having more excellent feeling of depth and high saturation can be obtained.

<Clear Coating Composition Application Step>

A clear coating composition application step is a step of forming an uncured clear coating film by coating a clear coating composition on the uncured base coating film. As for an application method, an electrostatic coating is preferably used.

A clear coating composition has a function of protecting the base coating film and improving the appearance of the multilayer coating film. As for the clear coating composition, an acid-epoxy curing system clear coating composition is preferably used. This acid-epoxy curing system clear coating composition contains an acid anhydride-containing acrylic resin (a), a carboxyl-containing ester resin (b), and a hydroxyl- and epoxy-containing acrylic resin (c). The clear coating composition is a high solid content coating composition and a clear coating film formed from this clear coating composition has excellent acid resistance.

A molar ratio of the carboxyl groups contained in the acid anhydride-containing acrylic resin (a) and the carboxyl-containing polyester resin (b) and the epoxy groups contained in the hydroxyl- and epoxy-containing acrylic resin (c) is preferably from 1/1.4 to 1/0.6 and more preferably from 1/1.2 to 1/0.8. When the molar ratio thereof exceeds 1/0.6, the curability of the coating film may degrade, and, when the molar ratio thereof is less than 1/1.4, the coating film may turn yellow.

Further, a molar ratio of the carboxyl groups contained in the acid anhydride containing acrylic resin (a) and a total of the hydroxyl groups contained in the carboxyl-containing polyester resin (b) and the hydroxyl- and epoxy-containing acrylic resin (c) is preferably from 1/2.0 to 1/0.5 and more preferably from 1/1.5 to 1/0.7. When the molar ratio of these exceeds 1/0.5, the curability of the coating film may degrade, and, when the molar ratio of these is less than 1/2.0, the water resistance may degrade because the number of hydroxyl groups becomes excessive.

The above respective resins are compounded at contents that satisfy the above preferable molar ratio. Specifically, the respective resins are compounded according to compounding amounts calculated by a calculation method known to a person skilled in the art, based on the hydroxyl values, acid values and epoxy equivalents of the respective resins.

A curing mechanism of the clear coating composition is as shown below. First, upon heating, the acid anhydride groups in the acid anhydride-containing acrylic resin (a) react with the hydroxyl groups contained in the carboxyl-containing polyester resin (b) and the hydroxyl- and epoxy-containing acrylic resin (c). Thus, crosslinking points are formed and carboxyl groups are generated. Then, the generated carboxyl groups and the carboxyl groups in the carboxyl-containing polyester resin (b) react with the epoxy groups in the hydroxyl- and epoxy-containing acrylic resins (c). Thus, more crosslinking points are formed. As was described above, when three kinds of resins mutually perform a crosslinking reaction, a top clear coating film having a high crosslinking density can be formed.

The clear coating composition may contain blocked isocyanate with the intention of improving the crosslinking density and water resistance. Further, the top clear coat may contain a UV-absorbent and a hindered amine light stabilizer, an anti-oxidant and the like with the intention of improving the weather resistance of the coating film. Further, crosslinked resin particles as a rheology control agent and a surface conditioner for adjusting appearance may be contained. Still further, with the intention of adjusting the viscosity, alcohol-based solvents (for example, methanol, ethanol, propanol, butanol or the like), hydrocarbon-based and ester-based solvents may be contained as a diluent.

In the case of using the crosslinked resin particles, the crosslinked resin particles are added at an amount of from 0.01 to 10 parts by mass and preferably at an amount of from 0.1 to 5 parts by mass to 100 parts by mass of the resin solid content of the clear coating composition. When the addition amount of the crosslinked resin particles exceeds 10 parts by mass, the appearance may degrade, and, when the addition amount is less than 0.01 parts by mass, the rheology control effect may not be obtained.

The respective resins have an acid group as a functional group. Therefore, these can be rendered water-soluble by neutralizing with an amine.

Further, as for the clear coating composition, a commercially available product can be used. For example, MAC-O-1820 Clear (one pack type) or O-2100 Clear (two pack type) manufactured by Nippon Paint Co., Ltd. can be used as a clear coating composition.

<Baking Step>

A baking step is a step of simultaneously baking and curing the uncured intermediate coating film, the uncured base coating film and uncured clear coating film.

A baking temperature of the present step is preferably from 100 to 180° C. and more preferably from 120 to 160° C. Further, a baking time of the present step varies depending on the baking temperature, but is preferably from 10 to 30 minutes when the baking temperature is from 120 to 160° C.

Further, the dry film thickness of the clear coating film is preferably from 10 to 80 μm and more preferably from 20 to 60 μm. When the film thickness of the clear coating film exceeds 80 μm, the sharpness degrades, and inconveniences such as irregularity, pinhole or flow may occur during coating. Further, when the film thickness of the top clear coating film is less than 10 μm, cutting of the film may occur.

While the multilayer coating film having the feeling of depth of the effect described below has a first base coating film containing a photoluminescent pigment and a second base coating film containing a colored pigment and a clear coating film disposed on an intermediate coat coating film, in the present embodiment according to the present invention, as a method of simplifying the application step, with the intention of reducing the number of layers of the multilayer coating film, a base coating film and a clear coating film are disposed on the intermediate coat coating film and a function of the base coating film is imparted to the intermediate coating film on an electrodeposition coating film. In order to impart a function of the base coating film to the intermediate coating film, it is considered that the intermediate coating film is not formed into a coating film provided with a high hiding property like a conventional one but is formed into a coating film provided with a low hiding property, and the photoluminescent pigment or the like is compounded in the intermediate coating film. However, when the hiding property of the intermediate coating film is lowered, the light transmittance increases. As a result, a light beam reaches the electrodeposition coating film having intrinsically low light resistance. Thus, at the same time with degradation of the electrodeposition coating film, there occurs a big issue that the peeling is generated in an interface between the intermediate coating film and the electrodeposition coating film.

Regarding this issue, in the present embodiment, a thin film shaped photoluminescent pigment having a relatively small particle size such as the volume average particle diameter $D_{50}$ of from 5 to 20 μm and an average thickness of from 0.01 to 0.3 μm was compounded in the intermediate coating film. Thus, the high hiding property of the intermediate coating film can be secured, and the light transmittance can be suppressed to a low level. As a result, the peeling can be avoided in an interface between the intermediate coating film and the electrodeposition coating film. Therefore, according to the present embodiment, the number of layers of the multilayer coating film can be reduced more than before, and the multilayer coating film having an excellent feeling of depth can be obtained by a step simpler than in the prior art. Resultantly, the operation can be simplified, and the cost can be cut.

The present embodiment is preferably applied to the multilayer coating film having high saturation such as red, blue, and green.

The present invention is not limited to the above embodiments, and, modifications, improvements or the like within the range that can achieve an object of the present invention are included in the present invention.

EXAMPLES

Next, the present invention will be described in more detail with reference to examples. However, the present invention is not limited to these examples. Hereinafter, unless otherwise noted, "parts" and "%" are based on mass.

Production Example 1: Preparation of Hydroxyl-Containing Acrylic Resin Emulsion

In an ordinary reactor for manufacturing an acrylic resin emulsion provided with a stirrer, a thermometer, a dropping funnel, a reflux condenser and a nitrogen introducing pipe, 445 parts of water and 5 parts of Newcol 293 (product name, manufactured by Nippon Nyukazai Co., Ltd.) were charged, followed by heating to 75° C. while stirring. A mixture of a monomer mixture (methyl methacrylate: 7.8%, butyl acrylate: 54.2%, styrene: 10.0%, acrylic acid 4-hydroxybutyl: 20.6%, methacrylic acid: 1.6%, and ethyl acrylate: 6.0%), 240 parts of water and 30 parts of Newcol 293 was emulsified using a homogenizer, this monomer pre-emulsified liquid was dropped into the reactor over for 3 hours under stirring. In parallel with the dropping of the monomer pre-emulsified liquid, an aqueous solution obtained by dissolving 1 parts of APS (ammonium persulfate) as a polymerization initiator in 50 parts of water was evenly dropped in the above reactor until the dropping of the above monomer pre-emulsified liquid was over. After the end of the dropping of the above monomer pre-emulsified liquid, the reaction was further continued at 80° C. for 1 hour, followed by cooling. After cooling, an aqueous solution in which 2 parts of dimethyl aminoethanol was dissolved in 20 parts of water was charged, and a hydroxyl-containing acrylic resin emulsion containing 40.6% by mass of a nonvolatile component (solid hydroxyl value: 80 mg KOH/g, solid acid value: 10.4 mg KOH/g) was obtained. The obtained hydroxyl-containing acrylic resin emulsion was adjusted to pH 7.2 using a 30% dimethyl aminoethanol aqueous solution.

Production Example 2: Preparation of Melamine Resin

In a reactor in which 128.2 g (4.0 mol) of methanol and 74.1 g (1.0 mol) of n-butanol were compounded, an aqueous solution of sodium hydroxide was added to adjust the pH to 11.8, followed by adding 169.7 g (5.2 mol) of paraformaldehyde (92% CH2O). After a mixture was heated at 60° C. for 20 minutes to dissolve paraformaldehyde in methanol, 126.1 g (1.0 mol) of melamine was added, followed by adjusting the pH to 13.0 with the aqueous solution of sodium hydroxide. At a reflux temperature, the reaction was performed for 1 hour while distilling methanol outside of the system, followed by enriching until an inner temperature became 110° C. under normal pressure. Then, 320.4 g (10.0 mol) of methanol and 741.2 g (10.0 mol) of n-butanol were added, followed by adjusting the pH to 2.0 with sulfuric acid, further followed by making it react at 30° C. for 3.5 hours. Thereafter, the pH of a mixture was adjusted to 9.2 with the aqueous solution of sodium hydroxide. By filtering a neutralizing salt, a filtrate was enriched under reduced pressure, and a melamine resin was obtained.

Production Example 3: Preparation of Intermediate Coating Composition

The hydroxyl-containing acrylic resin emulsion of Production Example 1, the melamine resin of Production Example 2, and photoluminescent pigments (USUMAKUARUMI 11-2069, USUMAKUARUMI 111-2068, an aluminum photoluminescent pigment Alpaste 01-0651 manufactured by Toyo Aluminum K.K., a photoluminescent pigment MH-8801 manufactured by Asahi Chemical Co., Ltd.) and colored pigments (Red P2GL, TM8270 Red, CR-97 Titan, R-5000 Black) shown in Table 1 were compounded at the contents shown in Table 1. After that, by homogeneously dispersing mixtures, intermediate coating compositions having coating composition number of from 1 to 14 shown in Table 1 were obtained. The "USUMAKUARUMI 11-2069" in Table 1 is "Aluminum Paste 11-2069" manufactured by Toyo Aluminum K.K, "USUMAKUARUMI 11-2068" is "Aluminum Paste 11-2068" manufactured by Toyo Aluminum K.K, "TOYOARUMI 01-0651" is "Aluminum Paste 01-0651" manufactured by Toyo Aluminum K.K, "ASAHIKASEI MH-8801" is "Aluminum Paste MH-8801" manufactured by Asahi Kasei Corporation, "Red P2GL" is "Hostaperm Red P2GL-WD" manufactured by Clariant Japan, "TM8270 Red" is "DAIPYROXIDE RED TM8270" manufactured by Dainichiseika Color & Chemicals Manufacturing Company, "CR-97 Titanium" is "Titanium Dioxide CR-97" manufactured by Ishihara Sangyo Kaisha Ltd., and "R-5000 Black" is "Raven 5000" manufactured by Columbian Chemicals Company.

Production Example 4: Preparation of Base Coating Composition

A base coating composition was prepared. Specifically, in addition to
(1) 236 parts of an acrylic emulsion resin manufactured by Nippon Paint Co., Ltd. (an average particle size: 150 nm, a nonvolatile portion: 20%, a solid acid value: 20 mg KOH/g, a hydroxyl value: 40 mg KOH/g),
(2) 10 parts of a 10% aqueous solution of dimethylethanolamine,
(3) 28.3 parts of an aqueous acryl resin manufactured by Nippon Paint Co., Ltd., (a nonvolatile portion: 30%, a solid acid value: 40 mg KOH/g, a hydroxyl value: 50 mg KOH/g),
(4) 8.6 parts of Primepole PX-1000 manufactured by Sanyo Kasei Co., Ltd., (a bifunctional polyether polyol, a number average molecular weight: 400, a hydroxyl value: 278 mg KOH/g, a ratio of primary/secondary hydroxyl values=63/37, a solid content: 100%),
(5) 21.5 parts of Cymel 204 manufactured by Mitsui Cytec Inc., (an alkylated melamine resin, a nonvolatile portion: 100%)
(6) 26 parts of "NeoRez R-9603" manufactured by Avecia Resins (a polycarbonate-based urethane emulsion resin, a nonvolatile portion: 33%) and,
(7) 0.2 parts of lauryl acid phosphate, colored pigments (Red P2GL and Maroon L-3920) shown in Table 2 and Table 3 were compounded at contents (PWCs) shown in Table 2 and Table 3. After that, a mixture was homogeneously dispersed and a base coating composition was obtained. "Maroon L-3920" in Table 3 is "Paliogen Maroon L-3920" manufactured by BASF Japan.

Examples 1 to 21 and Comparative Examples 1 to 28

A SPCC-SD steel sheet (dull steel sheet) treated with zinc phosphate and measuring 20 cm wide by 30 cm long by 0.8 mm thick was subjected to electrodeposition coating with a cation electrodeposition coating composition "Power Top U-50" manufactured by Nippon Paint Co., Ltd. so that a dry film thickness is 20 μm. The resultant was baked at 160° C. for 30 minutes.

Then, on the obtained electrodeposition coating film, respective intermediate coating compositions prepared in Production Example 3 were electrostatically coated such that a dry film thickness is 30 μm.

Then, after preheating at 80° C. for 3 minutes, the base coating composition prepared in Production Example 4 was coated wet on wet using a Cartridge Bell (a rotary atomizing coater manufactured by ABB Industries) such that a dry film thickness is 15 μm.

Then, after preheating at 80° C. for 3 minutes, a clear coating composition "MACFLOW 0-1830 Clear" (an acid epoxy curing type acrylic resin-based coating composition, manufactured by Nippon Paint Co., Ltd.) was coated wet on wet so that a dry film thickness is 35 μm using a rotary atomizing electrostatic coater, a pp. Bell by a common name. After coating, followed by baking at 140° C. for 30 minutes, thus multilayer coating films of the respective examples and comparative examples were obtained.

<Evaluation>
[Black and White Hiding Property]

Black and white hiding thicknesses of the respective intermediate coating compositions of Coating Composition Number 1 to 14 were evaluated. The black/white hiding film thickness was measured using a contrast ratio measurement paper (JIS K-5600) used in a measurement of the hiding power of the intermediate coating composition. Specifically, first, the intermediate coat was spray coated on a 2×2 cm square monochrome checked pattern that the contrast measurement paper has such that a film thickness gradient of a dry film thickness can be formed, followed by baking and curing. Then, a limit coating film region where the black/ white checked pattern cannot be seen through was visually determined, and a film thickness of the region was measured. The measured film thickness was taken as the black/white hiding thickness. Results are shown in Table 1.

[Light Transmittance]

The light transmittance in a wavelength region of from 400 to 700 nm was measured of each of the respective intermediate coating compositions of the Coating Composition Number of from 1 to 14. The light transmittance was measured in such a manner that the intermediate coating composition was coated on a base at a film thickness of 30 μm the same as the dry film thickness of the intermediate coating film in the multilayer coating film and heated and cured at 140° C., followed by peeling this to prepare a light transmittance measurement film, further followed by measuring the light transmittance for every 10 nm in the wavelength of from 400 to 700 nm using a spectrophotometer (U-3310 manufactured by Hitachi Limited). Results are shown in Table 1.

[25° C.* Value]

The 25° C.* value of the base coating film was measured according to JIS Z8729. Specifically, "CM512m-3" (a spectrophotometric colorimeter manufactured by Konica Minolta, Inc.) was used to measure the 25° C.* value.

[Feeling of Depth]

The multilayer coating films of the respective examples and comparative examples were subjected to a test that evaluates the feeling of depth. Specifically, the multilayer coating films were visually evaluated based on the following evaluation criteria.

(Evaluation Criteria of Feeling of Depth)
1: An intense feeling of depth is felt.
2: An appropriate feeling of depth is felt.
3: A feeble feeing of depth is felt.
4: The feeling of depth is not felt.

[Peeling Test Evaluation]

Each of Examples and Comparative Examples was irradiated with a Xe-lamp (100 W) for 1400 hours, followed by dipping in a hot water bath at 40° C. for 10 days. Thereafter, a cross-cut peeling test was performed, a test piece in which the peeling was found was determined to be NG, and a test piece in which the peeling was not found was determined to be OK.

The test pieces determined to be OK were further subjected to Xe-lamp (100 W) irradiation for 1400 hours, followed by dipping in a hot water bath at 40° C. for 10 days. Thereafter, the peeling test was performed, a test piece in which the peeling was found was determined to be NG, and a test piece in which the peeling was not found was determined to be OK. Results are shown in Table 2 and Table 3.

TABLE 1

| | Compounding Composition | PWC | D50 (μm) | Average Thickness (μm) | Coating Composition Number | | | | | |
|---|---|---|---|---|---|---|---|---|---|---|
| | | | | | 1 | 2 | 3 | 4 | 5 | 6 |
| Intermediate Coating | USUMAKUARUMI 11-2069 | 9 | 0.12 | | 5.0 | 10.0 | 15.0 | — | — | — |
| | USUMAKUARUMI 11-2068 | 15 | 0.15 | | — | — | — | 10.0 | 15.0 | 20 |
| | TOYOARUMI 01-0651 | 9 | 0.35 | | — | — | — | — | — | — |
| | ASAHI KASEI MH-8801 | 15 | 0.40 | | — | — | — | — | — | — |
| | Red P2GL | | — | — | 10.0 | 10.0 | — | 10.0 | 10.0 | 10.0 |
| | TM8270 Red | | — | — | 1.0 | 1.0 | — | 1.0 | 1.0 | 1.0 |
| | Titanium CR-97 | | — | — | 0.5 | 0.5 | — | 0.5 | 0.5 | 0.5 |
| | R-5000 Black | | — | — | 0.5 | 0.5 | — | 0.5 | 0.5 | 0.5 |
| | (Subtotal) | 48.0 | 1.0 | | 17.0 | 22.0 | 15.0 | 22.0 | 27.0 | 32.0 |
| Black/white Hiding Property (μm) | | | — | — | 15 | 13 | 10 | 15 | 13 | 12 |
| Light Transmittance 400-700 nm | | | — | — | 0.23 | 0.20 | 0.15 | 0.22 | 0.20 | 0.15 |

| | Compounding Composition | PWC | Coating Composition Number | | | | | | | |
|---|---|---|---|---|---|---|---|---|---|---|
| | | | 7 | 8 | 9 | 10 | 11 | 12 | 13 | 14 |
| Intermediate Coating | USUMAKUARUMI 11-2069 | — | — | — | — | — | — | — | — |
| | USUMAKUARUMI 11-2068 | 30 | — | — | — | — | — | — | — |
| | TOYOARUMI 01-0651 | — | 5.0 | 10.0 | 15.0 | — | — | — | — |
| | ASAHI KASEI MH-8801 | — | — | — | — | 10.0 | 15.0 | 20.0 | 30.0 |
| | Red P2GL | 10.0 | 10.0 | 10.0 | — | 10.0 | 10.0 | 10.0 | 10.0 |
| | TM8270 Red | 1.0 | 1.0 | 1.0 | — | 1.0 | 1.0 | 1.0 | 1.0 |
| | Titanium CR-97 | 0.5 | 0.5 | 0.5 | — | 0.5 | 0.5 | 0.5 | 0.5 |
| | R-5000 Black | 0.5 | 0.5 | 0.5 | — | 0.5 | 0.5 | 0.5 | 0.5 |
| | (Subtotal) | 42.0 | 17.0 | 22.0 | 15.0 | 22.0 | 27.0 | 32.0 | 42.0 |
| Black/white Hiding Property (μm) | | 9 | 18 | 16 | 13 | 18 | 16 | 18 | 16 |
| Light Transmittance 400-700 nm | | 0.12 | 0.40 | 0.35 | 0.30 | 0.45 | 0.40 | 0.33 | 0.28 |

TABLE 2

| | | | Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Intermediate Coating Film | Coating Composition Number | | 1 | | 2 | | 3 | | 4 | | 5 | | 6 | | 7 | |
| Base Coating Film | Pigment (PWC) | Red P2GL | 5 | 10 | 5 | 10 | 5 | 10 | 5 | 10 | 5 | 10 | 5 | 10 | 5 | 10 |
| | | C* Value (25°) | 25 | 25 | 25 | 25 | 25 | 25 | 25 | 25 | 25 | 25 | 25 | 25 | 25 | 25 |
| Multilayer Coating Film | Evaluation of Feeling of Depth | | 2 | 1 | 1 | 1 | 2 | 1 | 1 | 1 | 2 | 1 | 1 | 1 | 1 | 1 |
| | Peeling Test | | OK | OK | OK | OK | OK | OK | OK | OK | OK | OK | OK | OK | OK | OK |

| | | | Comparative Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Intermediate Coating Film | Coating Composition Number | | 8 | | 9 | | 10 | | 11 | | 12 | | 13 | | 14 | |
| Base Coating Film | Pigment (PWC) | Red P2GL | 5 | 10 | 5 | 10 | 5 | 10 | 5 | 10 | 5 | 10 | 5 | 10 | 5 | 10 |
| | | C* Value (25°) | 25 | 25 | 25 | 25 | 25 | 25 | 25 | 25 | 25 | 25 | 25 | 25 | 25 | 25 |
| Multilayer Coating Film | Evaluation of Feeling of Depth | | 2 | 1 | 1 | 1 | 2 | 1 | 1 | 1 | 2 | 1 | 2 | 1 | 2 | 1 |
| | Peeling Test | | NG | NG | NG | NG | NG | NG | NG | NG | NG | NG | NG | NG | NG | NG |

TABLE 3

| | | | Example | | | | | | | Comparative Example | | | |
|---|---|---|---|---|---|---|---|---|---|---|---|---|---|
| | | | 15 | 16 | 17 | 18 | 19 | 20 | 21 | 15 | 16 | 17 | 18 |
| Intermediate Coating Film | Coating Composition Number | | 1 | 2 | 3 | 4 | 5 | 6 | 7 | 8 | | 9 | |
| Base Coating Film | Pigment (PWC) | Maroon L-3920 | 10 | 10 | 10 | 10 | 10 | 10 | 10 | 5 | 10 | 5 | 10 |
| | | C* Value (25°) | 18 | 18 | 18 | 18 | 18 | 18 | 18 | 18 | 18 | 18 | 18 |
| Multilayer Coating Film | Evaluation of Feeling of Depth | | 3 | 3 | 3 | 3 | 3 | 3 | 3 | 4 | 3 | 3 | 3 |
| | Peeling Test | | OK | OK | OK | OK | OK | OK | OK | NG | NG | NG | NG |

| | | | Comparative Example | | | | | | | | | |
|---|---|---|---|---|---|---|---|---|---|---|---|---|
| | | | 19 | 20 | 21 | 22 | 23 | 24 | 25 | 26 | 27 | 28 |
| Intermediate Coating Film | Coating Composition Number | | 10 | | 11 | | 12 | | 13 | | 14 | |
| Base Coating Film | Pigment (PWC) | Maroon L-3920 | 5 | 10 | 5 | 10 | 5 | 10 | 5 | 10 | 5 | 10 |
| | | C* Value (25°) | 18 | 18 | 18 | 18 | 18 | 18 | 18 | 18 | 18 | 18 |
| Multilayer Coating Film | Evaluation of Feeling of Depth | | 4 | 3 | 3 | 3 | 4 | 3 | 4 | 3 | 4 | 3 |
| | Peeling Test | | NG | NG | NG | NG | NG | NG | NG | NG | NG | NG |

As shown in Tables 1 to 3, according to the present examples, it was confirmed that a multilayer coating film having an excellent feeling of depth is obtained and the peeling in an interface between the intermediate coating film and the electrodeposition coating film can be avoided.

INDUSTRIAL APPLICABILITY

According to the present invention, a multilayer coating film having an excellent feeling of depth can be obtained by a simple step. Therefore, the method of forming a multilayer coating film of the present invention can be preferably applied to an object to be coated having a complicated and large shape such as an outer plate of an automobile body or the like.

It should be noted that the first pre-heating step and the second pre-heating step are not indispensable, that is, these pre-heating steps may not be disposed.

EXPLANATION OF REFERENCE NUMERALS

1 . . . MULTILAYER COATING FILM
11 . . . ELECTRODEPOSITION COATING FILM
12 . . . INTERMEDIATE COATING FILM
13 . . . BASE COATING FILM
14 . . . CLEAR COATING FILM
120 . . . PHOTOLUMINESCENT PIGMENT

The invention claimed is:
1. A method of forming a multilayer coating film comprising:
  forming an uncured intermediate coating film by coating an intermediate coating composition containing a photoluminescent pigment directly on an electrodeposition coating film formed on an object to be coated;
  pre-heating the uncured intermediate coating film at a temperature of 60° C. to 110° C. for 3 to 10 minutes so as to orient the photoluminescent pigment in a state in which its surface direction is in parallel with an object to be coated;

forming an uncured base coating film by coating a base coating composition containing a colored pigment on the uncured intermediate coating film;

forming an uncured clear coating film by coating a clear coating composition on the uncured base coating film; and simultaneously baking and curing the uncured intermediate coating film, the uncured base coating film and the uncured clear coating film, wherein a content of the photoluminescent pigment in the intermediate coating composition is from 5 to 30% by mass, the photoluminescent pigment in the intermediate coating composition has a volume average particle size $D_{50}$ of from 5 to 20 μm and a thin film shape having an average thickness of from 0.01 to 0.3 μm, the intermediate coating composition contains a colored pigment, when the intermediate coating film formed from the intermediate coating composition is formed on a white solid coating film having an L* value of 80 at a film thickness of 15±3 μm, a 25° C.* value is 20 or more, and the base coating film formed from the base coating composition has the 25° L* value of 60 or less and the 25° C.* value of 25 or more.

2. The method of forming a multilayer coating film according to claim 1, wherein the intermediate coating film formed of the intermediate coating composition has a light transmittance of 0.25% or less in a wavelength of from 400 to 700 nm.

3. The method of forming a multilayer coating film according to claim 1, comprising a second pre-heating between the base coating composition coating and the clear coating composition coating.

4. The method of forming a multilayer coating film according to claim 1, wherein a content of the colored pigment in the base coating composition is from 1 to 30% by mass.

* * * * *

UNITED STATES PATENT AND TRADEMARK OFFICE
CERTIFICATE OF CORRECTION

PATENT NO. : 10,632,498 B2
APPLICATION NO. : 15/107364
DATED : April 28, 2020
INVENTOR(S) : Shinichi Fujiwara It is certified that error appears in the above-identified patent and that said Letters Patent is hereby corrected as shown below:

In the Specification

In Column 10, Line 16, delete "Ltd.)" and insert --Ltd.,)--.

In Column 11, Line 5, delete "micell" and insert --micelle--.

In Column 16, Line 17, delete "gamma-caprylolactone," and insert --gamma-caprolactone,--.

In Column 18, Line 62, delete "film" and insert --film.--.

In Column 20, Line 32, delete "methacrilonitrile);" and insert --methacrylonitrile);--.

In Column 29, Line 16, delete "CH2O)." and insert --$CH_2O$).--.

In Column 30, Line 51, delete "pp." and insert --μμ--.

In Column 31, Line 23, delete "28729." and insert --Z8729.--.

In Column 32, Table 1, Line 2, delete "D50" and insert --$D_{50}$--.

Signed and Sealed this
Fifteenth Day of December, 2020

Andrei Iancu
*Director of the United States Patent and Trademark Office*